(12) United States Patent
Abe et al.

(10) Patent No.: US 12,241,731 B2
(45) Date of Patent: Mar. 4, 2025

(54) DISPLACEMENT MEASUREMENT DEVICE, NON-CONTACT INPUT APPARATUS, AND BIOLOGICAL MICROMOTION MEASUREMENT APPARATUS

(71) Applicants: Yuki Abe, Kanagawa (JP); Suguru Sangu, Kanagawa (JP); Toshiki Yamanaka, Osaka (JP); Ryo Saito, Kanagawa (JP)

(72) Inventors: Yuki Abe, Kanagawa (JP); Suguru Sangu, Kanagawa (JP); Toshiki Yamanaka, Osaka (JP); Ryo Saito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 18/168,781

(22) Filed: Feb. 14, 2023

(65) Prior Publication Data

US 2023/0296369 A1 Sep. 21, 2023

(30) Foreign Application Priority Data

Mar. 15, 2022 (JP) .................. 2022-040520

(51) Int. Cl.
*G01B 11/00* (2006.01)
*G01B 11/02* (2006.01)
(Continued)

(52) U.S. Cl.
CPC .......... *G01B 11/002* (2013.01); *G01B 11/026* (2013.01); *G01B 11/14* (2013.01);
(Continued)

(58) Field of Classification Search
CPC ..... G01B 11/002; G01B 11/026; G01B 11/03; G01B 11/14; G01B 11/16; G01B 11/162;
(Continued)

(56) References Cited

U.S. PATENT DOCUMENTS 11,050,931 B2 * 6/2021 Fujita ................... H04N 23/675
2016/0106327 A1 4/2016 Yoon et al.
(Continued)

FOREIGN PATENT DOCUMENTS

EP 3962069 3/2022
JP 2020-161992 10/2020
(Continued)

OTHER PUBLICATIONS

Zhou Ge, et al., "Event-based laser speckle correlation for micro motion estimation", 0146-9592/163885-04 Journal @ 2021 Optical Society of America, vol. 46, No. 16 / Aug. 15, 2021 / Optics Letters, p. 3885-p. 3888.
(Continued)

*Primary Examiner* — Gordon J Stock, Jr.
(74) *Attorney, Agent, or Firm* — IPUSA, PLLC

(57) ABSTRACT

A displacement measurement device includes: an irradiation unit that irradiates a measurement object with coherent light; a luminance-change coordinate point detection unit that detects a luminance-change coordinate point where a luminance change has occurred, based on light reflected from the measurement object, and outputs data related to the luminance-change coordinate point; and circuitry that calculates an amount of displacement of the measurement object, based on the data related to the luminance-change coordinate point, by performing computations of a first numerical sequence and a second numerical sequence. The first numerical sequence includes a set of first elements each representing a location of the luminance-change coordinate point extracted from the data. The second numerical sequence includes a set of second elements each representing a location of the luminance-change coordinate point extracted from the data.

13 Claims, 19 Drawing Sheets

(51) Int. Cl.
  *G01B 11/14* (2006.01)
  *G01S 17/58* (2006.01)
  *G06V 10/62* (2022.01)
  *G06V 40/20* (2022.01)
  *H04N 23/71* (2023.01)
(52) U.S. Cl.
  CPC .............. *G01S 17/58* (2013.01); *G06V 10/62* (2022.01); *G06V 40/20* (2022.01); *G06V 40/28* (2022.01); *H04N 23/71* (2023.01)
(58) Field of Classification Search
  CPC ..... G01B 11/167; G01B 11/30; G01B 11/303; G01B 11/306; G06V 40/167; G06V 40/20; G06V 40/28; G06V 20/69; G06V 20/693; G06V 20/695; G06V 20/698; G06V 10/60; G06V 10/62; G06V 10/75; G06V 10/751; G06V 10/757; G06V 10/758; G06V 10/762; G06V 10/80; G06V 10/806; H04N 23/71; G01S 17/08; G01S 17/42; G01S 17/50; G01S 17/58
  See application file for complete search history.

(56) References Cited

U.S. PATENT DOCUMENTS

| | | | |
|---|---|---|---|
| 2019/0286228 A1 | 9/2019 | Sangu | |
| 2020/0162653 A1* | 5/2020 | Kuwayama | ............ H04N 23/72 |
| 2022/0101640 A1* | 3/2022 | Lagorce | ................ G06T 7/269 |

FOREIGN PATENT DOCUMENTS

| | | | |
|---|---|---|---|
| JP | 2023059422 A | * | 4/2023 |
| WO | WO-2019171986 A1 | * | 9/2019 |
| WO | WO-2019172043 A1 | * | 9/2019 |
| WO | WO2020/116067 A1 | | 6/2020 |
| WO | 2020157157 | | 8/2020 |

OTHER PUBLICATIONS

Ge Zhou et al., "Lens-free motion analysis via neuromorphic laser speckle imaging", Optics Express, vol. 30, No. 2, Jan. 17, 2022 (Jan. 17, 2022), p. 2206, XP093025867, US ISSN 1094-4087, DOI: 10.1364/OE.444948 Whole document, in particular Chapter 2, 3 and 4 and figures 1-4.

Barranco Francisco et al, "Contour Motion Estimation for Asynchronous Event-Driven Cameras", Proceedings of the IEEE, IEEE. New York, US, vol. 102, No. 10, Oct. 1, 2014(Oct. 1, 2014), pp. 1537-1556, XP011559309 ISSN 0018-9219, DOI:10.1109/JPROC. 2014.2347207, (retrieved on Sep. 16, 2014), Whole document, in particular figures 1, 3, 4, 11, p. 1547, left-hand column, lines 11-14 and p. 1549, left-hand column, last paragraph.

Extended European Search Report for 23158278.4 mailed on Jul. 21, 2023.

* cited by examiner

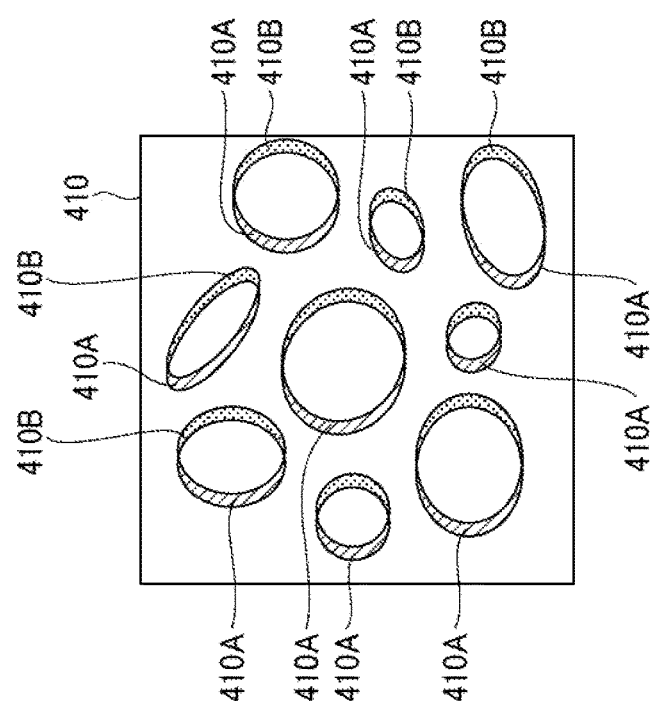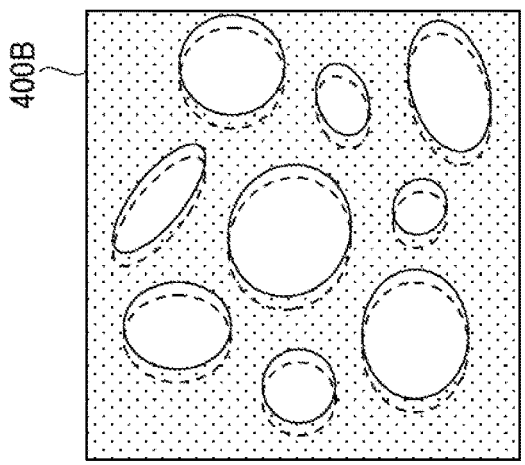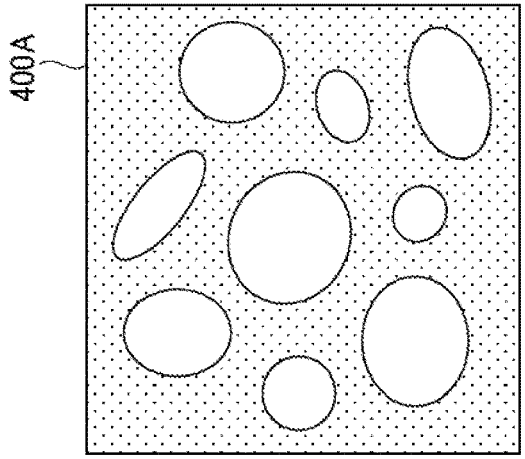

FIG. 6A
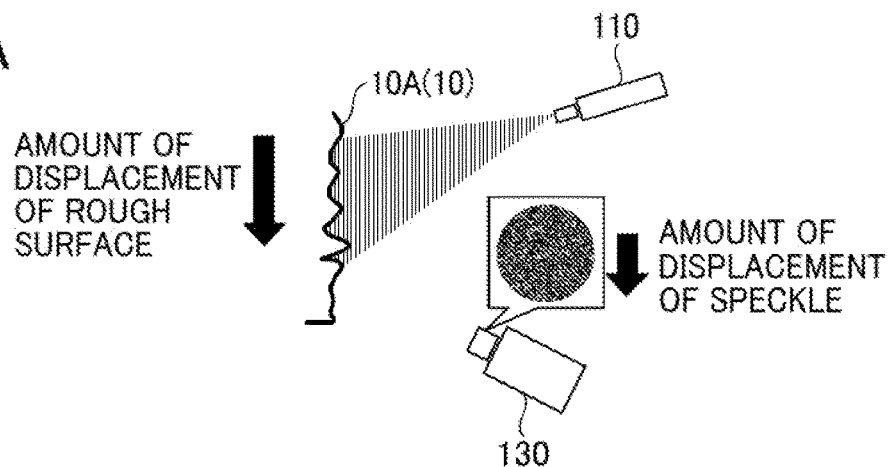
FIG. 6B
| TIMESTAMP | X | Y | POLARITY | |
|---|---|---|---|---|
| 0 | 101 | 90 | 1 | |
| 48 | 20 | 228 | 1 | 600 |
| 53 | 13 | 13 | 1 | |
| 105 | 254 | 178 | 0 | |
| ⋮ | | | | |
| 173 | 142 | 57 | 0 | |
| 174 | 140 | 142 | 0 | 601 |
| 174 | 139 | 90 | 0 | |
| 175 | 138 | 145 | 0 | |
FIG. 6C
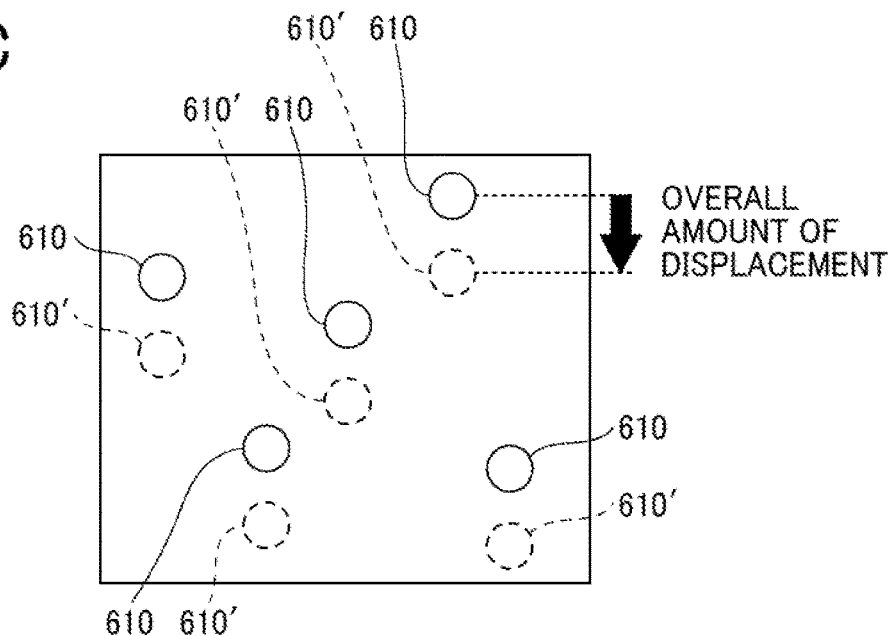

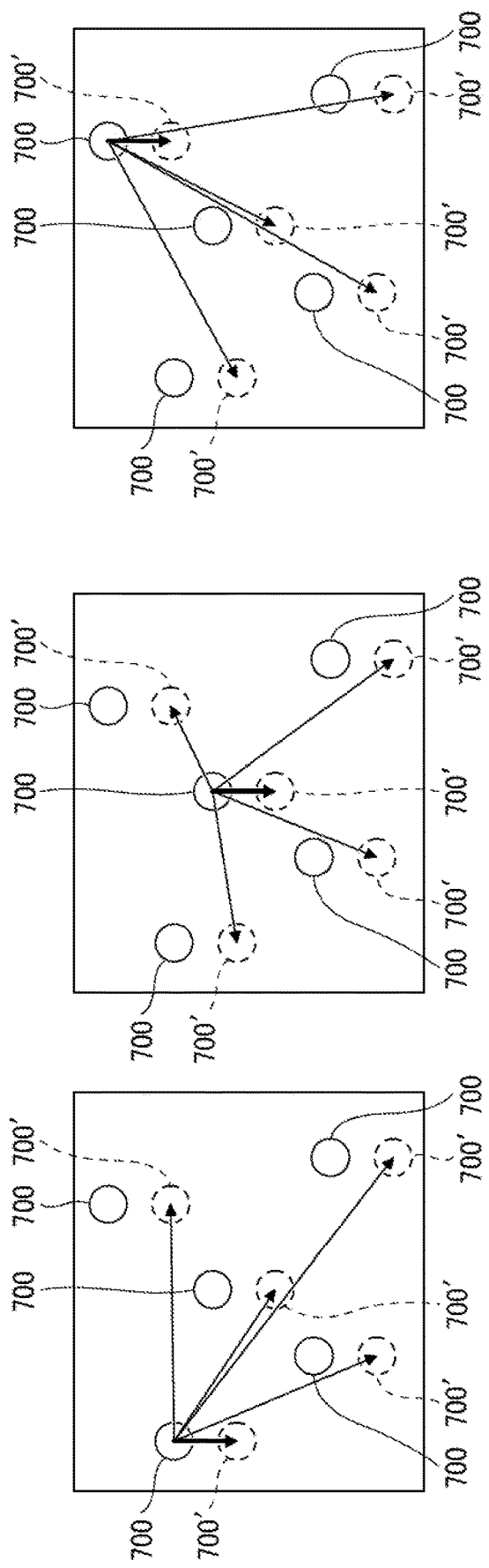

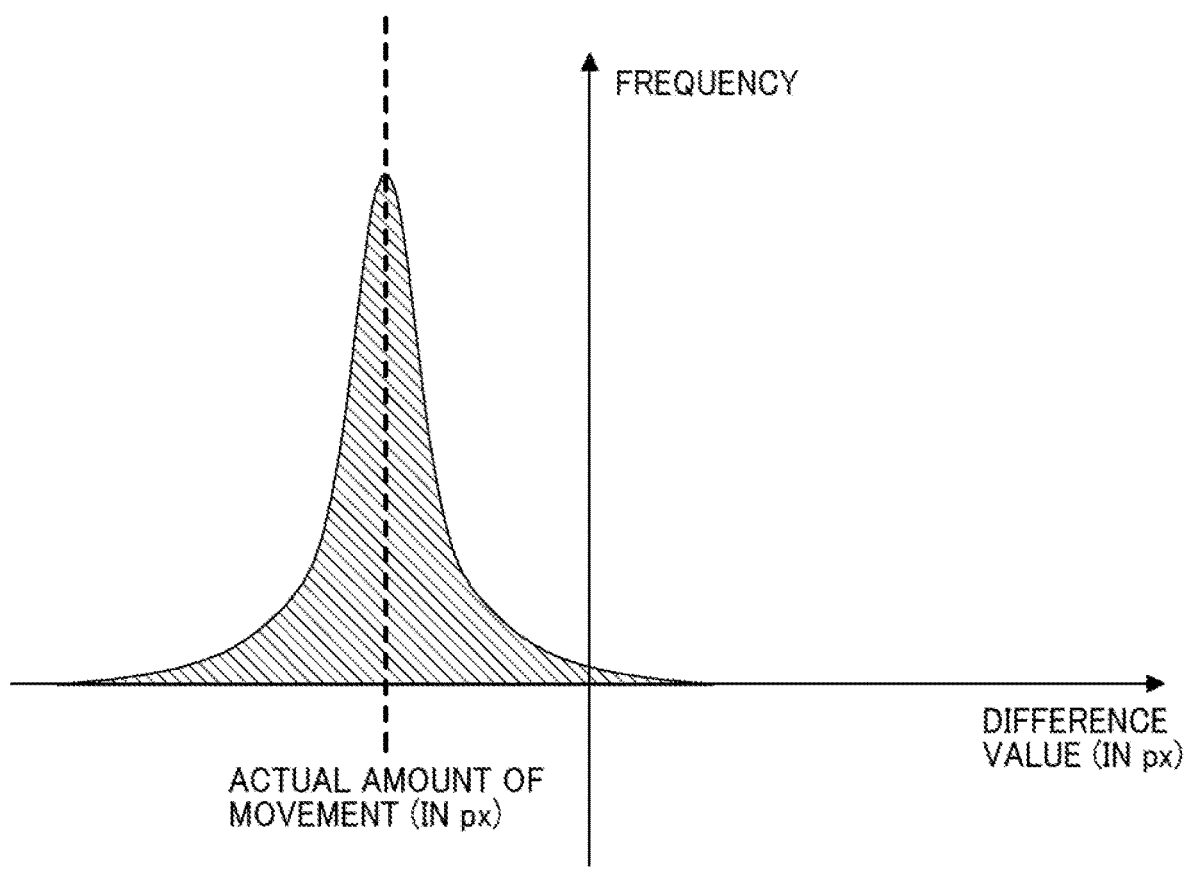

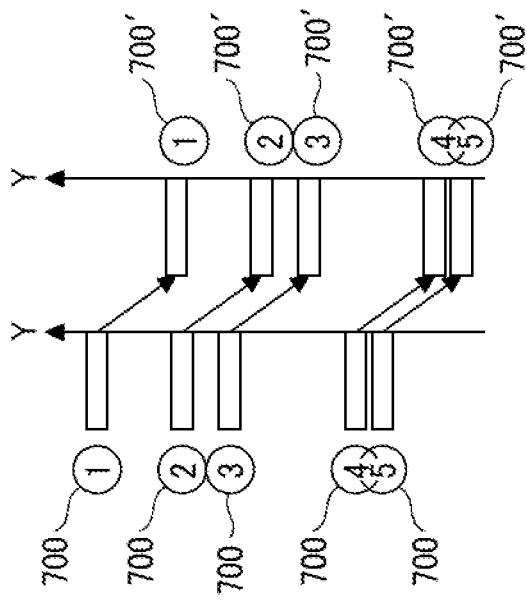
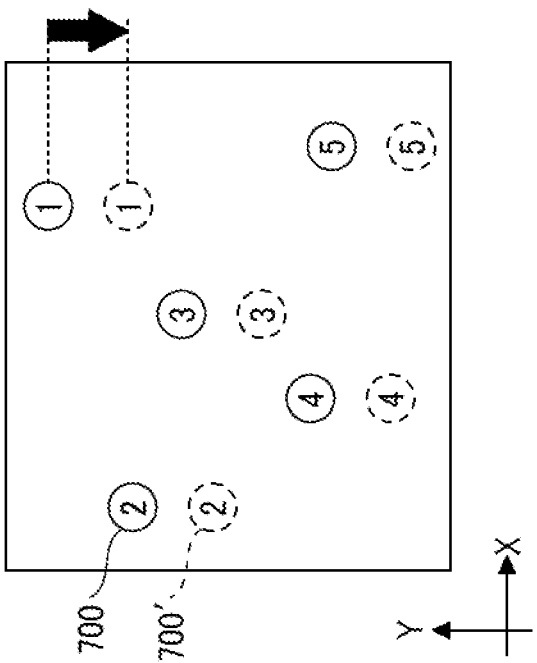

DISPLACEMENT MEASUREMENT DEVICE, NON-CONTACT INPUT APPARATUS, AND BIOLOGICAL MICROMOTION MEASUREMENT APPARATUS

CROSS-REFERENCE TO RELATED APPLICATIONS

This patent application is based on and claims priority pursuant to 35 U.S.C. § 119(a) to Japanese Patent Application No. 2022-040520, filed on Mar. 15, 2022, in the Japan Patent Office, the entire disclosure of which is hereby incorporated by reference herein.

BACKGROUND

Technical Field

The present disclosure relates to a displacement measurement device, a non-contact input apparatus, and a biological micromotion measurement apparatus.

Related Art

According to the known technique for measuring the amount of micro-displacement of a measurement object, speckle patterns are acquired using an event-based vision sensor to generate speckle pattern images, and image processing is performed on the speckle pattern images to measure the amount of micro-displacement of the measurement object.

In an existing object displacement measurement technique using an event-based vision sensor and speckle pattern images, event information output from photodetectors in an asynchronous manner is accumulated for a certain amount of time and is converted into images, and existing image processing is applied to the images to calculate the amounts of translation of the speckle pattern images. Such a technique involves a relatively large amount of computation in spite of the use of an event-based vision sensor, and the amount of displacement of the measurement object is difficult to detect at a high speed.

SUMMARY

According to an embodiment of the present disclosure, a displacement measurement device includes an irradiation unit, a luminance-change coordinate point detection unit, and circuitry. The irradiation unit irradiates a measurement object with coherent light. The luminance-change coordinate point detection unit detects a luminance-change coordinate point where a luminance change has occurred, based on light reflected from the measurement object, and outputs data related to the luminance-change coordinate point. The circuitry calculates an amount of displacement of the measurement object, based on the data related to the luminance-change coordinate point, by performing computations of a first numerical sequence and a second numerical sequence. The first numerical sequence includes a set of first elements each representing a location of the luminance-change coordinate point extracted from the data. The second numerical sequence includes a set of second elements each representing a location of the luminance-change coordinate point extracted from the data.

According to an embodiment of the present disclosure, a non-contact input apparatus includes the displacement measurement device and a non-contact input identification unit that detects a non-contact operation based on information indicating the amount of displacement output from the displacement measurement device.

According to an embodiment of the present disclosure, a biological micromotion measurement apparatus includes the displacement measurement device and an optical system that receives reflected light from the measurement object. The reflected light results from light emitted from the displacement measurement device. The measurement object includes a living organism. The circuitry of the displacement measurement device detects an amount of micro-displacement of the measurement object by using the reflected light.

At least one embodiment provides a displacement measurement device that can detect the amount of displacement of a measurement object at a high speed with reduced computational load.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 4A to 4C are illustrations of an example of event data output by the luminance-change coordinate point detection unit included in the displacement measurement device according to the first embodiment;

FIGS. 6A to 6C are illustrations of the principle of a method for estimating the amount of displacement of a measurement object by using the displacement estimation unit according to an embodiment;

FIGS. 7A to 7C are illustrations of an example method for calculating the amount of displacement of a measurement object by using the displacement estimation unit included in the displacement measurement device according to an embodiment;

FIG. 8 is a histogram representing a frequency distribution of difference values calculated by the displacement estimation unit included in the displacement measurement device according to an embodiment;

FIGS. 12A and 12B are illustrations of another example method for calculating the amount of displacement of a measurement object by using the displacement estimation unit included in the displacement measurement device according to an embodiment;

Figure 1:
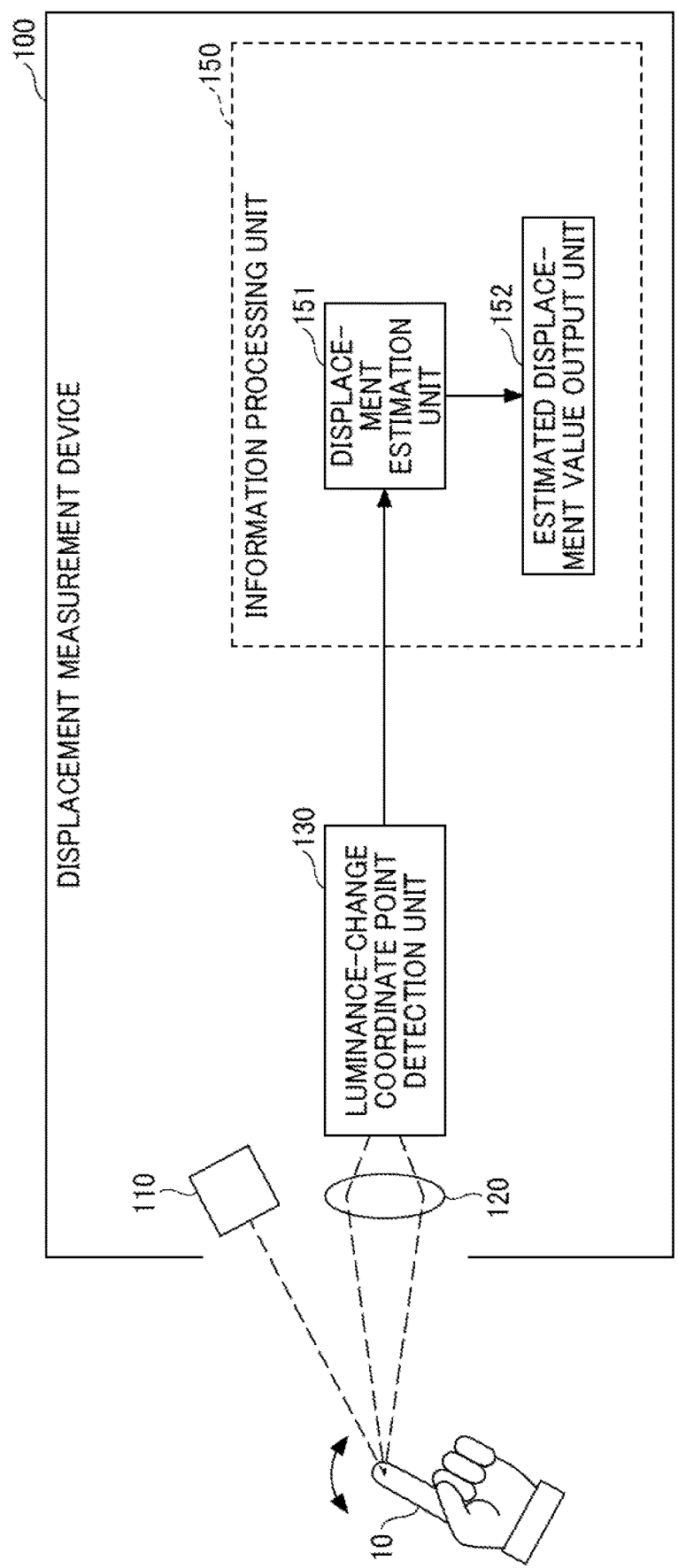
FIG. 1 is a diagram illustrating the general arrangement of a displacement measurement device according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments will be described hereinafter with reference to the drawings.

First Embodiment

General Arrangement of Displacement Measurement Device 100

FIG. 1 is a diagram illustrating the general arrangement of a displacement measurement device 100 according to a first embodiment. The displacement measurement device 100 illustrated in FIG. 1 is a device configured to irradiate a measurement object 10 (e.g., a hand of a person) with coherent light, detect a luminance-change coordinate point based on reflected light from the measurement object 10, and measure the amount of micro-displacement of the measurement object 10 based on event data related to the detected luminance-change coordinate point.

The term "luminance-change coordinate point" refers to a pixel where a certain amount or more of luminance change has occurred on an image sensor. The term "event data" refers to data related to a pixel whose luminance has changed a certain amount or more and including the time (T) of the luminance change, the location (X, Y) of the luminance change, and the polarity (P) of the luminance change.

The amount of micro-displacement of the measurement object 10, which is measured by the displacement measurement device 100, is output to, for example, an apparatus external to the displacement measurement device 100 and is used by the external apparatus for display to a user or control of an external apparatus to be controlled.

As illustrated in FIG. 1, the displacement measurement device 100 includes an irradiation unit 110 (also referred to as a "light projection unit"), an interference pattern forming unit 120, a luminance-change coordinate point detection unit 130, and an information processing unit 150.

The irradiation unit 110 irradiates the measurement object 10 with coherent light. The irradiation unit 110 is preferably a laser light source having high coherence to form an interference pattern of light reflected from the measurement object 10 on a light-receiving surface of the luminance-change coordinate point detection unit 130. Examples of the irradiation unit 110 include a laser diode (LD), a vertical-cavity surface-emitting laser (VCSEL), a small gas laser, and a solid state laser.

The interference pattern forming unit 120 forms an interference pattern from light reflected from the measurement object 10 (i.e., from coherent light reflected from the measurement object 10). In this embodiment, the interference pattern forming unit 120 is disposed on an optical path of light reflected from the measurement object 10 between the measurement object 10 and the luminance-change coordinate point detection unit 130. The interference pattern forming unit 120 has a function of adjusting the characteristics of an interference pattern received on the light-receiving surface of the luminance-change coordinate point detection unit 130 so that the amount of displacement of the measurement object 10 can be appropriately acquired. In an example, the interference pattern forming unit 120 includes a so-called wavefront control element such as a lens, an aperture, a phase shifter, or a spatial light modulator (SLM).

An example of interference patterns formed by the interference pattern forming unit 120 is a speckle image. The speckle image refers to random interference patterns caused by the roughness of the surface of the measurement object 10. The speckle image reflects the characteristics of light as a wave motion, and has a luminance distribution that changes sensitively to the movement of the measurement object 10. In other words, the speckle image is obtained by converting the sensitivity into a scale such that micro-displacement of the measurement object 10 is captured by the light-receiving surface of the luminance-change coordinate point detection unit 130.

The luminance-change coordinate point detection unit 130 receives, on the light-receiving surface, the interference pattern formed by the interference pattern forming unit 120, and detects a luminance-change coordinate point where a certain amount or more of luminance change has occurred, based on the received interference pattern. The luminance-change coordinate point detection unit 130 outputs event data related to the detected luminance-change coordinate point. An example configuration of the luminance-change coordinate point detection unit 130 will be described below with reference to FIGS. 2 and 3.

The information processing unit 150 includes a displacement estimation unit 151 and an estimated displacement value output unit 152.

The displacement estimation unit 151 calculates an estimated value of the amount of displacement of the measurement object 10 in a real space, based on the event data output from the luminance-change coordinate point detection unit 130.

The estimated displacement value output unit 152 outputs the estimated value of the amount of displacement of the measurement object 10, which is calculated by the displacement estimation unit 151.

In the displacement measurement device 100 according to the first embodiment, the displacement estimation unit 151 is configured to calculate an estimated value of the amount of displacement of the measurement object 10 in a real space by using two numerical-sequence processing systems. The two numerical-sequence processing systems are provided in parallel in terms of hardware for two numerical sequences of two elements (the X coordinate and the Y coordinate) representing the locations of luminance-change coordinate points.

In other words, the displacement estimation unit 151 is configured to perform the two calculations in parallel. One of the calculations is performed by a first numerical-sequence processing system P1, and the other calculation is performed by a second numerical-sequence processing system P2. The first numerical-sequence processing system P1 calculates the amount of displacement of the measurement object 10 along the X axis based on the numerical sequence of X-coordinate values. The second numerical-sequence processing system P2 calculates the amount of displacement of the measurement object 10 along the Y axis based on the numerical sequence of Y-coordinate values. As used herein, the term "in parallel" means that operations can be performed independently of each other, and is used to include a case where time periods during which the operations are performed partially overlap.

Accordingly, the displacement measurement device 100 according to the first embodiment can detect the amount of displacement of the measurement object 10 at a high speed with reduced computational load.

Each of the functions of the information processing unit 150 can be implemented by one or more processing circuits or circuitry. As used herein, the term "processing circuit or circuitry" is used to include a processor programmed to implement each function by software, such as a processor implemented by an electronic circuit, and devices designed to implement the functions described above, such as an application specific integrated circuit (ASIC), a digital signal processor (DSP), a field programmable gate array (FPGA), and existing circuit modules.

Example Configuration of Luminance-Change Coordinate Point Detection Unit 130

Figure 2:
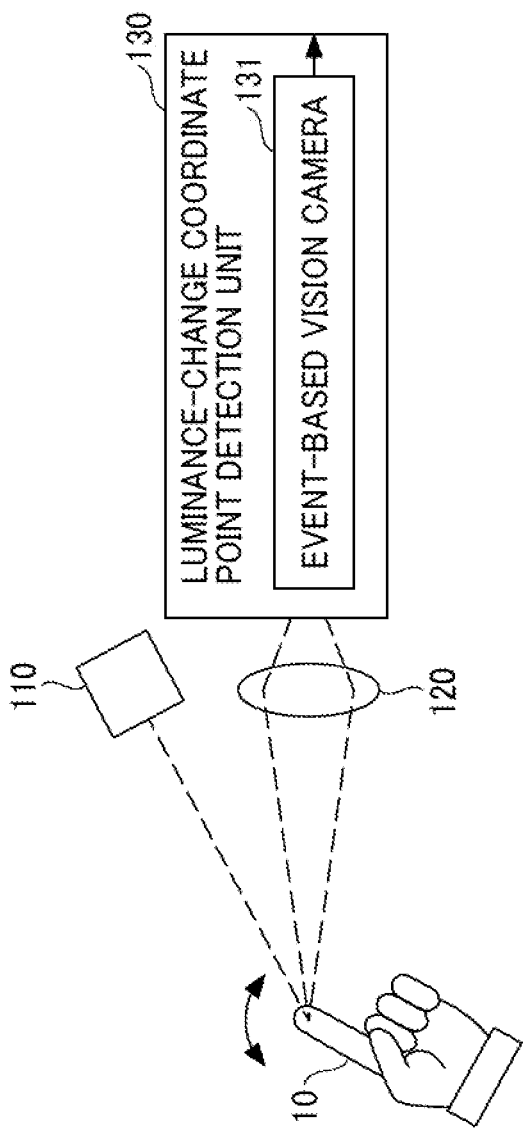
FIG. 2 is a diagram illustrating an example configuration of a luminance-change coordinate point detection unit included in the displacement measurement device according to the first embodiment.

FIG. 2 is a diagram illustrating an example configuration of the luminance-change coordinate point detection unit 130 included in the displacement measurement device 100 according to the first embodiment.

In the example illustrated in FIG. 2, the luminance-change coordinate point detection unit 130 includes an event-based vision camera 131.

The event-based vision camera 131 is equipped with an event-based vision sensor. The event-based vision sensor is configured to receive an interference pattern, instantaneously (i.e., in a very short time and at a very high speed) detect a luminance-change coordinate point where a certain amount or more of luminance change has occurred in a two-dimensional array of pixels, and output event data including the time (T) of the luminance change, the location (X, Y) of the luminance change, and the polarity (P) of the luminance change. Accordingly, the event-based vision camera 131 can directly generate event data.

In the displacement measurement device 100, the event-based vision camera 131 of the luminance-change coordinate point detection unit 130 is used to quickly acquire a speckle image that sensitively changes and reliably capture micro-displacement of the measurement object 10.

Other Example Configuration of Luminance-Change Coordinate Point Detection Unit 130

Figure 3:
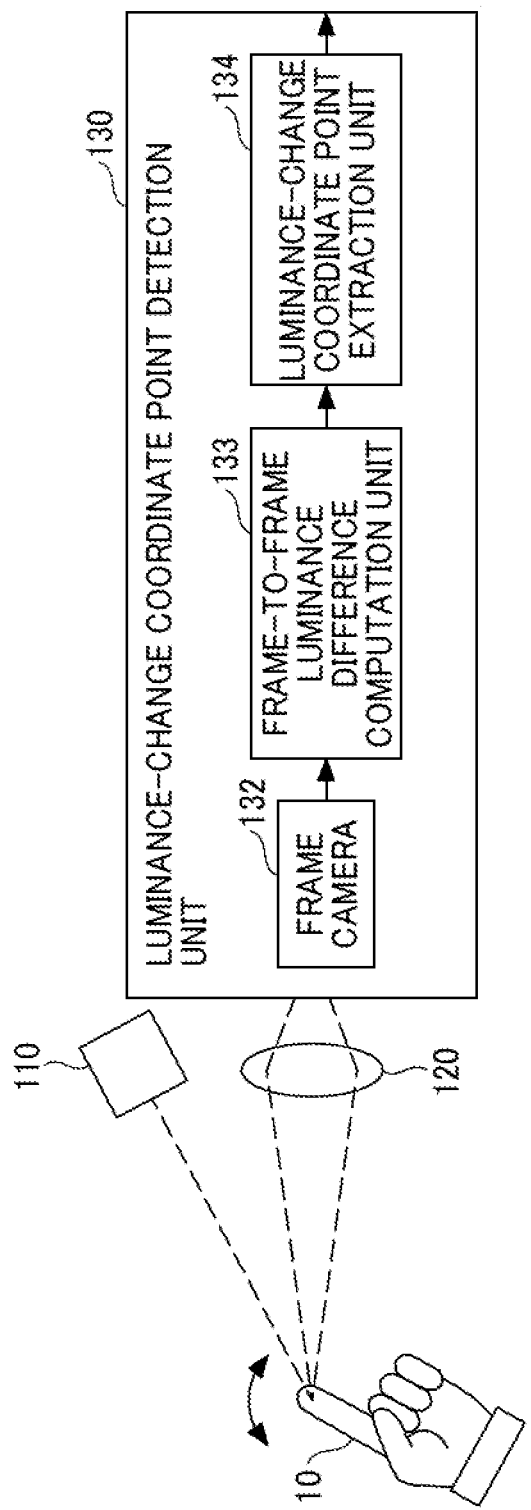
FIG. 3 is a diagram illustrating another example configuration of the luminance-change coordinate point detection unit included in the displacement measurement device according to the first embodiment.

FIG. 3 is a diagram illustrating another example configuration of the luminance-change coordinate point detection unit 130 included in the displacement measurement device 100 according to the first embodiment.

In the example illustrated in FIG. 3, the luminance-change coordinate point detection unit 130 includes a frame camera 132, a frame-to-frame luminance difference computation unit 133, and a luminance-change coordinate point extraction unit 134. The frame-to-frame luminance difference computation unit 133 and a luminance-change coordinate point extraction unit 134 are implemented by circuitry, such as a CPU.

The frame camera 132 captures a normal frame image in which the interference pattern appears, and outputs the frame image. The frame-to-frame luminance difference computation unit 133 calculates a luminance difference between corresponding pixels in two continuous frame images output from the frame camera 132. The luminance-change coordinate point extraction unit 134 extracts, as a luminance-change coordinate point, a pixel where a luminance difference greater than or equal to a certain value is calculated by the frame-to-frame luminance difference computation unit 133. The luminance-change coordinate point extraction unit 134 outputs event data related to the extracted luminance-change coordinate point. The event data includes the time (T) of the luminance change, the location (X, Y) of the luminance change, and the polarity (P) of the luminance change.

Example of Event Data output by Luminance-Change Coordinate Point Detection Unit 130

FIGS. 4A to 4C are illustrations of an example of event data output by the luminance-change coordinate point detection unit 130 included in the displacement measurement device 100 according to the first embodiment.

FIGS. 4A and 4B illustrate examples of a speckle image formed on a light-receiving surface of the event-based vision sensor included in the event-based vision camera 131. FIG. 4A illustrates a speckle image 400A at time t. FIG. 4B illustrates a speckle image 400B at time t+Δt. FIG. 4C illustrates event data 410, which is an example of the event data output from the event-based vision camera 131. The event data 410 is generated based on the speckle image 400A illustrated in FIG. 4A and the speckle image 400B illustrated in FIG. 4B.

The event-based vision sensor included in the event-based vision camera 131 is a photodetector that outputs event data. In response to detection of a pixel (i.e., a luminance-change coordinate point) where a luminance change exceeding a predetermined threshold has occurred among pixels arranged in a two-dimensional array (i.e., in response to the occurrence of an event), the event-based vision sensor outputs, as event data, data including the time (T) of the luminance change, the location (X, Y) of the luminance change, and the polarity (P) of the luminance change. The polarity (P) may have a binary value, namely, "1" for increase or "0" for decrease.

In an example, the speckle image 400A at the time t illustrated in FIG. 4A is horizontally translated, and, after Δt, the speckle image 400B at the time t+Δt illustrated in FIG. 4B is produced. In this case, as indicated by the event data 410 illustrated in FIG. 4C, with the polarities of luminance changes on the event-based vision sensor at the time t+Δt, the speckles are spatially distributed with decrease components 410A and increase components 410B. In FIG. 4C, the decrease components 410A are represented as lightly shaded regions, and the increase components 410B are represented as heavily shaded regions. In the decrease components 410A, the luminance values are decreased by a value greater than or equal to a certain value. In the increase components 410B, the luminance values are increased by a value greater than or equal to a certain value.

The event-based vision sensor outputs, for all the pixels in the increase components 410B, a time-series data group of signals including the times (T) of signal detection, the pixel locations (X, Y), and the polarity ("1": increase). The event-based vision sensor also outputs, for all the pixels in the decrease components 410A, a time-series data group of signals including the times (T) of signal detection, the pixel locations (X, Y), and the polarity ("0": decrease). The event-based vision sensor does not output data for the pixels in the other regions (non-shaded regions in FIG. 4C) that do not correspond to either the region of the decrease components 410A or the region of the increase components 410B. Accordingly, the event data 410 output from the event-based vision sensor has a much smaller amount of data than frame image data.

In this manner, the event-based vision sensor has no limitation in terms of frame rate and can output, as event data, shift information between speckle images at a higher speed than an image sensor that outputs frame image data.

For example, the event-based vision sensor has a sampling time of about 1 μs to 200 μs for all event data in the sensor surface. The sampling time of the event-based vision sensor is much faster than the frame rate of an ordinary video camera or the like. Accordingly, the event-based vision sensor included in the luminance-change coordinate point detection unit 130 can quickly and reliably detect a shift between speckle images, which changes sensitively to the displacement of the measurement object 10.

Principle of Displacement Estimation Using Displacement Estimation Unit 151

Figure 5A:
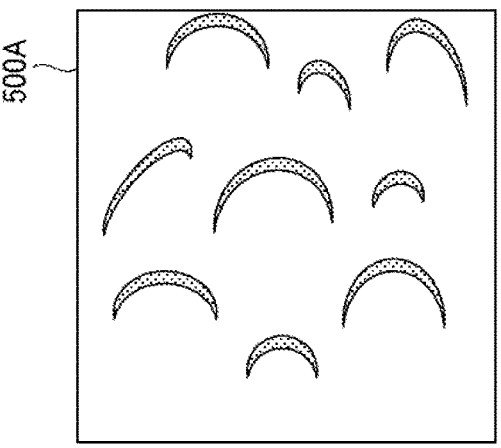
FIGS. 5A to 5C are illustrations of the principle of displacement estimation using a displacement estimation unit included in the displacement measurement device according to the first embodiment.
Figure 5B:
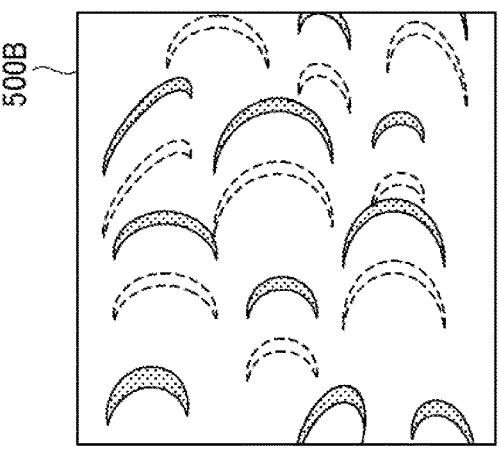
Figure 5C:
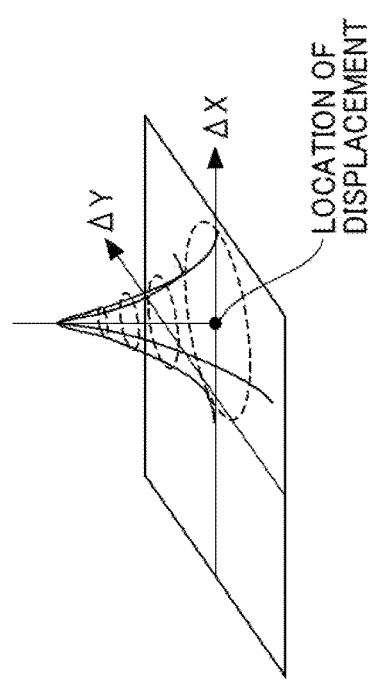

FIGS. 5A to 5C are illustrations of the principle of displacement estimation using the displacement estimation unit 151 included in the displacement measurement device 100 according to the first embodiment.

FIGS. 5A and 5B illustrate examples of a frame image based on the event data output from the event-based vision camera 131. FIG. 5A illustrates a frame image 500A at time t. FIG. 5B illustrates a frame image 500B at time t+Δts. In the frame images 500A and 500B, only increase components in which the luminance values are increased by a value greater than or equal to a certain value are illustrated. FIG. 5C illustrates an example of a cross-correlation function calculated based on the frame images 500A and 500B.

First, in the principle of displacement estimation, to obtain the frame image 500A illustrated in FIG. 5A from the time-series event data output from the event-based vision camera 131, an integration time for calculating unit frames is set, a two-dimensional matrix representing an image is prepared, and the number of times a row and column number corresponding to a pixel location appears in the integration time is counted.

Subsequently, in the principle of displacement estimation, as illustrated in FIG. 5B, the time of the frame image 500A illustrated in FIG. 5A, for example, a time distant from the integration start time (t) by Δts, is set as the start point of integration, and the number of times the row and column number appears in the integration time is also counted.

In the frame image 500B illustrated in FIG. 5B, dotted-line portions represent patterns in the frame image 500A illustrated in FIG. 5A. The patterns are translated to lightly shaded locations in the frame image 500B illustrated in FIG. 5B.

Subsequently, in the principle of displacement estimation, a cross-correlation function (see FIG. 5C) between the frame image 500A and the frame image 500B is calculated.

As illustrated in FIG. 5C, when a variable of the correlation function, that is, an amount of displacement, is plotted on the ΔX axis and the ΔY axis, a peak value of the cross-correlation function is obtained at a distance and location (an amount of pixel displacement in the image) corresponding to the amount of translation of the speckle pattern. For example, in the principle of displacement estimation, any one of the frame images 500A and 500B is shifted in the X-axis direction and the Y-axis direction to obtain an overlapping region between the frame images 500A and 500B, and such overlapping regions are integrated to calculate the cross-correlation function illustrated in FIG. 5C.

In the principle of displacement estimation, in an example, the following method (the Wiener-Khinchin theorem) may be used to calculate the cross-correlation function: The frame images 500A and 500B are subjected to a Fourier transform, and the complex conjugate of one of the frame images 500A and 500B is multiplied by the complex conjugate of the other of the frame images 500A and 500B before an inverse Fourier transform is performed.

Principle of Displacement Estimation Method Using Displacement Estimation Unit 151

FIGS. 6A to 6C are illustrations of the principle of a method for estimating the amount of displacement of a measurement object by using the displacement estimation unit 151 according to an embodiment.

FIG. 6A illustrates an optical system included in the displacement measurement device 100 according to an embodiment. FIG. 6B illustrates an example of event data groups output from the event-based vision camera 131 included in the displacement measurement device 100 according to an embodiment. FIG. 6C illustrates an image of event data groups at two different times.

As illustrated in FIG. 6A, the displacement measurement device 100 irradiates a rough surface 10A, which is the measurement object 10, with coherent light from the irradiation unit 110 and receives light reflected from the rough surface 10A on the light-receiving surface of the luminance-change coordinate point detection unit 130 to measure a speckle image formed on the light-receiving surface of the event-based vision camera 131.

As illustrated in FIG. 6A, if the rough surface 10A is displaced, the speckle image on the light-receiving surface of the luminance-change coordinate point detection unit 130 also translates in the same direction. The ratio of the amount of translation of the speckle image on the light-receiving surface of the luminance-change coordinate point detection unit 130 to the amount of displacement of the rough surface 10A is constant under the same conditions. Accordingly, the displacement measurement device 100 can estimate the amount of displacement of the measurement object 10 based on the translation of the speckle image on the light-receiving surface of the luminance-change coordinate point detection unit 130.

In FIG. 6B, an event data group 600 is an event data group including 100 items of event data that are continuous in time series. The event data group 600 is acquired at times before the displacement of the rough surface 10A. In FIG. 6B, an event data group 601 is an event data group including 100 items of event data that are continuous in time series. The event data group 601 is acquired at times after the displacement of the rough surface 10A. As illustrated in FIG. 6B, each item of event data in the event data groups 600 and 601 includes the time of a luminance change, coordinates of the luminance change, and the polarity of the luminance change.

Accordingly, the 100 items of event data included in the event data group 600 illustrated in FIG. 6B are summed up to obtain a plurality of speckle images 610 illustrated in FIG. 6C.

Further, the 100 items of event data included in the event data group 601 illustrated in FIG. 6B are summed up to obtain a plurality of speckle images 610' illustrated in FIG. 6C.

The plurality of speckle images 610 are translated to the plurality of speckle images 610' in response to the displacement of the rough surface 10A. Accordingly, the difference between the plurality of speckle images 610' and the plurality of speckle images 610 can be used to estimate the amount of displacement of the rough surface 10A.

Since the time between the event data groups 600 and 601 is very short, it can be assumed that the rough surface 10A and the plurality of speckle images 610 move with constant velocity. Accordingly, the patterns of the plurality of speckle images 610 and the patterns of the plurality of speckle images 610' are substantially the same.

Example of Displacement Calculation Method Using Displacement Estimation Unit 151

FIGS. 7A to 7C are illustrations of an example method for calculating the amount of displacement of the measurement object 10 by using the displacement estimation unit 151 included in the displacement measurement device 100 according to an embodiment.

A method for calculating the amount of displacement of the measurement object 10 will be described with reference to FIGS. 7A to 7C, typically using five luminance-change coordinate points included in an event data group.

In FIGS. 7A to 7C, luminance-change coordinate points 700 are detected at times before the displacement of the rough surface 10A. In FIGS. 7A to 7C, luminance-change coordinate points 700' are detected at times after the displacement of the rough surface 10A. The luminance-change coordinate points 700' are obtained by translating the luminance-change coordinate points 700.

First, as illustrated in FIG. 7A, the displacement estimation unit 151 focuses on the first luminance-change coordinate point 700 in the time series and calculates a difference value between the coordinate value of the first luminance-change coordinate point 700 and the coordinate value of each of the five luminance-change coordinate points 700'.

Subsequently, as illustrated in FIG. 7B, the displacement estimation unit 151 focuses on the second luminance-change coordinate point 700 in the time series and calculates a difference value between the coordinate value of the second luminance-change coordinate point 700 and the coordinate value of each of the five luminance-change coordinate points 700'.

Likewise, the displacement estimation unit 151 focuses on the third luminance-change coordinate point 700 in the time series and calculates a difference value between the coordinate value of the third luminance-change coordinate point 700 and the coordinate value of each of the five luminance-change coordinate points 700'.

Likewise, the displacement estimation unit 151 focuses on the fourth luminance-change coordinate point 700 in the time series and calculates a difference value between the coordinate value of the fourth luminance-change coordinate point 700 and the coordinate value of each of the five luminance-change coordinate points 700'.

Finally, as illustrated in FIG. 7C, the displacement estimation unit 151 focuses on the fifth luminance-change coordinate point 700 in the time series and calculates a difference value between the coordinate value of the fifth luminance-change coordinate point 700 and the coordinate value of each of the five luminance-change coordinate points 700'.

In other words, the displacement estimation unit 151 calculates, for all of the luminance-change coordinate points 700 included in the event data group before the displacement of the rough surface 10A, difference values in coordinate value from each of the luminance-change coordinate points 700' included in the event data group after the displacement of the rough surface 10A.

Accordingly, for example, in a case where the event data group before the displacement of the rough surface 10A includes 100 items of event data and the event data group after the displacement of the rough surface 10A includes 100 items of event data, the displacement estimation unit 151 calculates 100×100=10000 difference values.

Focus is placed on one luminance-change coordinate point 700 included in the event data group before the displacement. A plurality of difference values calculated for the luminance-change coordinate point 700 include one difference value ($\Delta x$, $\Delta y$) in the same direction and at the same distance as the direction and distance of translation of the entire speckle. This also applies to all of the luminance-change coordinate points 700.

As a result, the difference values calculated by the displacement estimation unit 151 include a number of difference values (Δx, Δy) in the same direction and at the same distance as the direction and distance of translation of the entire speckle, the number of difference values (Δx, Δy) being equal to the number of items of event data included in the event data group before the displacement.

Accordingly, the frequency distribution of the plurality of difference values calculated by the displacement estimation unit 151 is converted into a histogram having peaks at difference values (Δx, Δy) in the same direction and at the same distance as the direction and distance of translation of the entire speckle.

Frequency Distribution of Difference Values Calculated by Displacement Estimation Unit 151

FIG. 8 is a histogram representing a frequency distribution of difference values calculated by the displacement estimation unit 151 included in the displacement measurement device 100 according to an embodiment.

The histogram illustrated in FIG. 8 represents a frequency distribution of difference values calculated by the displacement estimation unit 151 using the method described with reference to FIGS. 7A to 7C. In FIG. 8, the horizontal axis represents the difference value between coordinate values (X coordinates or Y coordinates), and the vertical axis represents the frequency.

As illustrated in FIG. 8, the histogram representing the frequency distribution of difference values has a peak at a certain difference value. The difference value at the peak is equal to the actual amount of translation (actual amount of movement) of the speckle image.

Accordingly, the displacement estimation unit 151 can identify the mode of the difference values as the actual amount of translation of the speckle image. Based on the mode, the displacement estimation unit 151 can estimate the amount of displacement of the rough surface 10A of the measurement object 10.

As described above, the displacement estimation unit 151 can directly compute differences between numerical sequences to calculate the amount of translation of a speckle image without generating two speckle images by the integration of two event data groups. Thus, the displacement estimation unit 151 can calculate the amount of displacement of the measurement object 10 at a high speed with reduced computational load.

Functional Configuration of Displacement Estimation Unit 151

Figure 9:
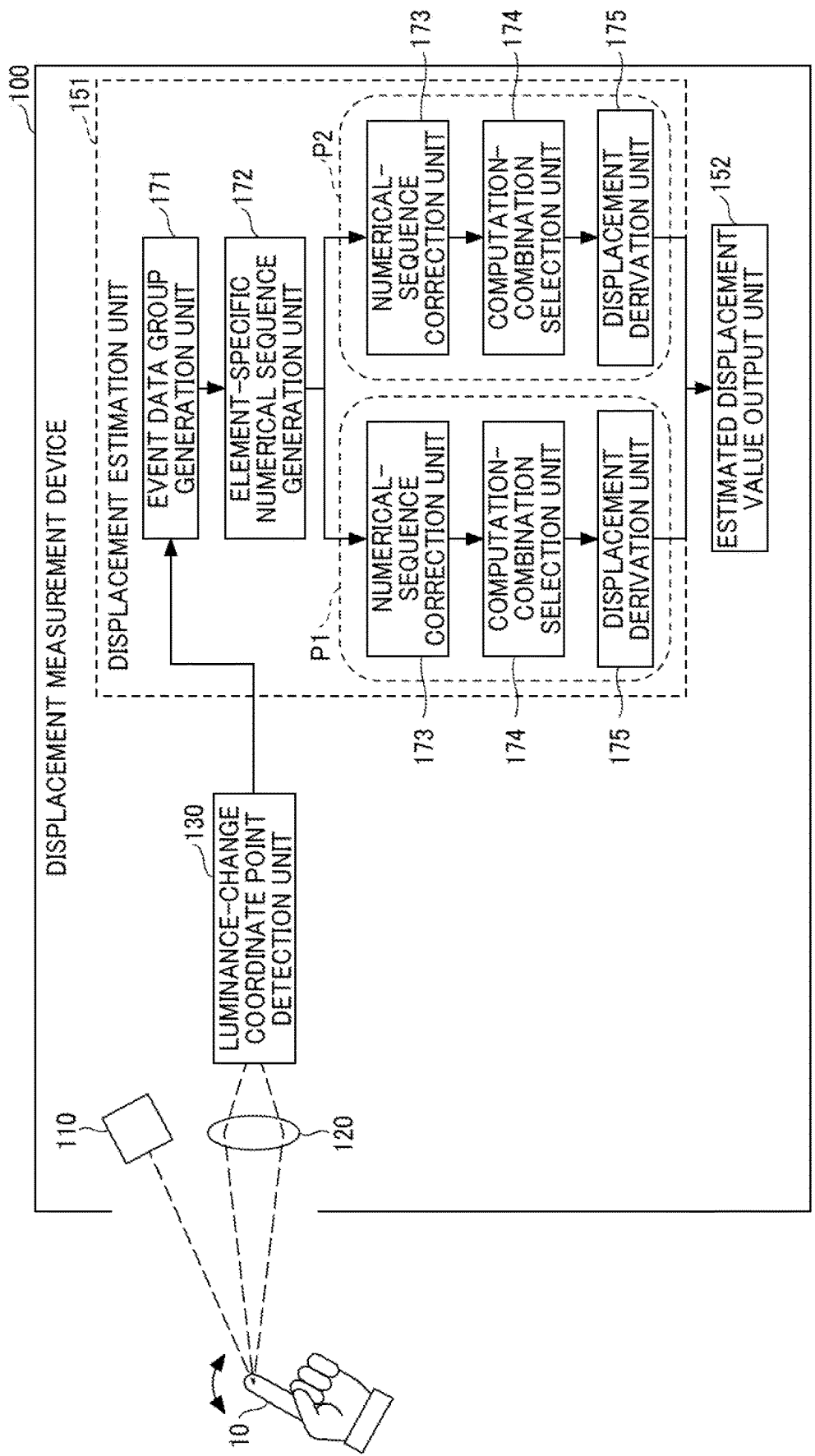
FIG. 9 is a diagram illustrating an example functional configuration of the displacement estimation unit included in the displacement measurement device according to an embodiment.

FIG. 9 is a diagram illustrating an example functional configuration of the displacement estimation unit 151 included in the displacement measurement device 100 according to an embodiment.

As illustrated in FIG. 9, the displacement estimation unit 151 includes an event data group generation unit 171 and an element-specific numerical sequence generation unit 172.

The event data group generation unit 171 acquires a predetermined number of items of event data output from the luminance-change coordinate point detection unit 130 and generates an event data group including the predetermined number of items of event data.

The element-specific numerical sequence generation unit 172 generates a numerical sequence for each element in the event data group generated by the event data group generation unit 171. Specifically, the element-specific numerical sequence generation unit 172 generates a first numerical sequence including a set of X coordinates (an example of a "first element") and a second numerical sequence including a set of Y coordinates (an example of a "second element").

The displacement estimation unit 151 includes the first numerical-sequence processing system P1 and the second numerical-sequence processing system P2.

The first numerical-sequence processing system P1 performs computation of the first numerical sequence including the set of X coordinates (an example of a "first element") representing the locations of the luminance-change coordinate points extracted from the event data to calculate the amount of displacement of the measurement object 10 along the X coordinates.

The second numerical-sequence processing system P2 performs computation of the second numerical sequence including the set of Y coordinates (an example of a "second element") representing the locations of the luminance-change coordinate points extracted from the event data to calculate the amount of displacement of the measurement object 10 along the Y coordinates.

The first numerical-sequence processing system P1 and the second numerical-sequence processing system P2 each include a numerical-sequence correction unit 173, a computation-combination selection unit 174, and a displacement derivation unit 175.

The numerical-sequence correction unit 173 performs predetermined correction on the first numerical sequence or the second numerical sequence. Examples of the predetermined correction include a process of extracting a luminance-change coordinate point of event data having either positive or negative polarity, and a sorting process.

The computation-combination selection unit 174 selects combinations of luminance-change coordinate points to be subjected to computation for the first numerical sequence or the second numerical sequence that is corrected by the numerical-sequence correction unit 173. Specifically, the computation-combination selection unit 174 selects combinations of luminance-change coordinate points included in one event data group and luminance-change coordinate points included in the other event data group (e.g., round-robin combinations or combinations of corresponding luminance-change coordinate points in the descending orders).

The displacement derivation unit 175 calculates difference values between coordinate values for each of the combinations of luminance-change coordinate points selected by the computation-combination selection unit 174. Then, the displacement derivation unit 175 identifies the mode of the calculated difference values as the actual amount of translation of the speckle image on the X axis or the Y axis. Based on the mode, the displacement derivation unit 175 estimates the amount of displacement of the measurement object 10 on the X axis or the Y axis. Further, the displacement derivation unit 175 outputs the estimated amount of displacement of the measurement object 10 on the X axis or the Y axis to the estimated displacement value output unit 152.

In an example, the displacement estimation unit 151 does not include the numerical-sequence correction unit 173 or the computation-combination selection unit 174. In other words, in an example, the displacement estimation unit 151 does not correct numerical sequences or select combinations of luminance-change coordinate points to be subjected to computation. In this example, the displacement estimation unit 151 may automatically select "round-robin combinations".

Example of Operation Procedure Using Displacement Estimation Unit 151

Figure 10:
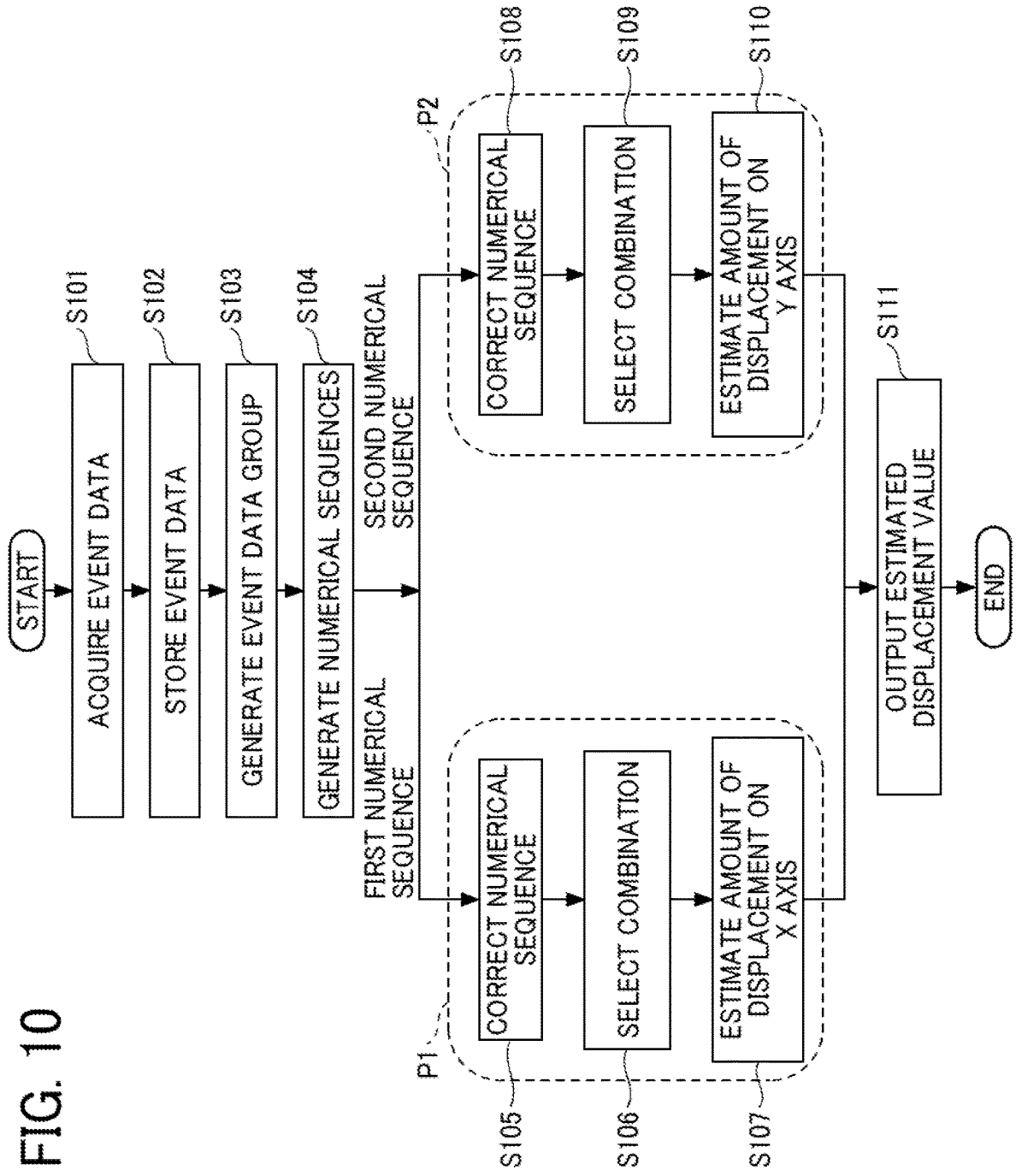
FIG. 10 is a flowchart illustrating an example operation procedure performed by the displacement estimation unit included in the displacement measurement device according to an embodiment.

FIG. 10 is a flowchart illustrating an example operation procedure performed by the displacement estimation unit 151 included in the displacement measurement device 100 according to an embodiment.

First, the event data group generation unit 171 acquires the event data output from the luminance-change coordinate point detection unit 130 (step S101). Subsequently, the event data group generation unit 171 stores the event data acquired in step S101 in a memory included in the displacement measurement device 100 (step S102).

The event data group generation unit 171 repeatedly performs the processing of steps S101 and S102 to store a predetermined number of (for example, 100) items of event data in the memory. Subsequently, the event data group generation unit 171 generates an event data group from the predetermined number of items of event data (step S103).

Further, the event data group generation unit 171 performs the processing of steps S101 to S103 twice to generate event data groups obtained at two different times.

Subsequently, the element-specific numerical sequence generation unit 172 generates, for each of the two generated event data groups, a first numerical sequence including a set of X coordinates and a second numerical sequence including a set of Y coordinates (step S104).

Subsequently, in the first numerical-sequence processing system P1, the numerical-sequence correction unit 173 performs predetermined correction (e.g., classification based on polarity, and sorting) on the first numerical sequence (step S105). Further, the computation-combination selection unit 174 selects combinations of luminance-change coordinate points to be subjected to computation for the first numerical sequence corrected in step S105 (step S106). Subsequently, the displacement derivation unit 175 calculates difference values between coordinate values for all the combinations of luminance-change coordinate points selected in step S106, and identifies the mode of the calculated difference values as the actual amount of translation of the speckle image on the X axis. Based on the mode, the displacement derivation unit 175 estimates the amount of displacement of the measurement object 10 on the X axis (step S107).

In parallel with the processing of steps S105 to S107, in the second numerical-sequence processing system P2, the numerical-sequence correction unit 173 performs predetermined correction (e.g., classification based on polarity, and sorting) on the second numerical sequence (step S108). Further, the computation-combination selection unit 174 selects combinations of luminance-change coordinate points to be subjected to computation for the second numerical sequence corrected in step S108 (step S109). Subsequently, the displacement derivation unit 175 calculates difference values between coordinate values for all the combinations of luminance-change coordinate points selected in step S109, and identifies the mode of the calculated difference values as the actual amount of translation of the speckle image on the Y axis. Based on the mode, the displacement derivation unit 175 estimates the amount of displacement of the measurement object 10 on the Y axis (step S110).

Further, the displacement derivation unit 175 outputs the amount of displacement of the measurement object 10 on the X axis, which is estimated in step S107, the amount of displacement of the measurement object 10 on the Y axis, which is estimated in step S110, to the estimated displacement value output unit 152 (step S111).

Thereafter, the displacement estimation unit 151 ends the series of operations illustrated in FIG. 10. The displacement estimation unit 151 repeatedly performs the series of operations illustrated in FIG. 10 to continuously estimate the amount of displacement of the measurement object 10 at a high speed.

Example of Amount of Calculation with Displacement Estimation Unit 151

Figure 11:
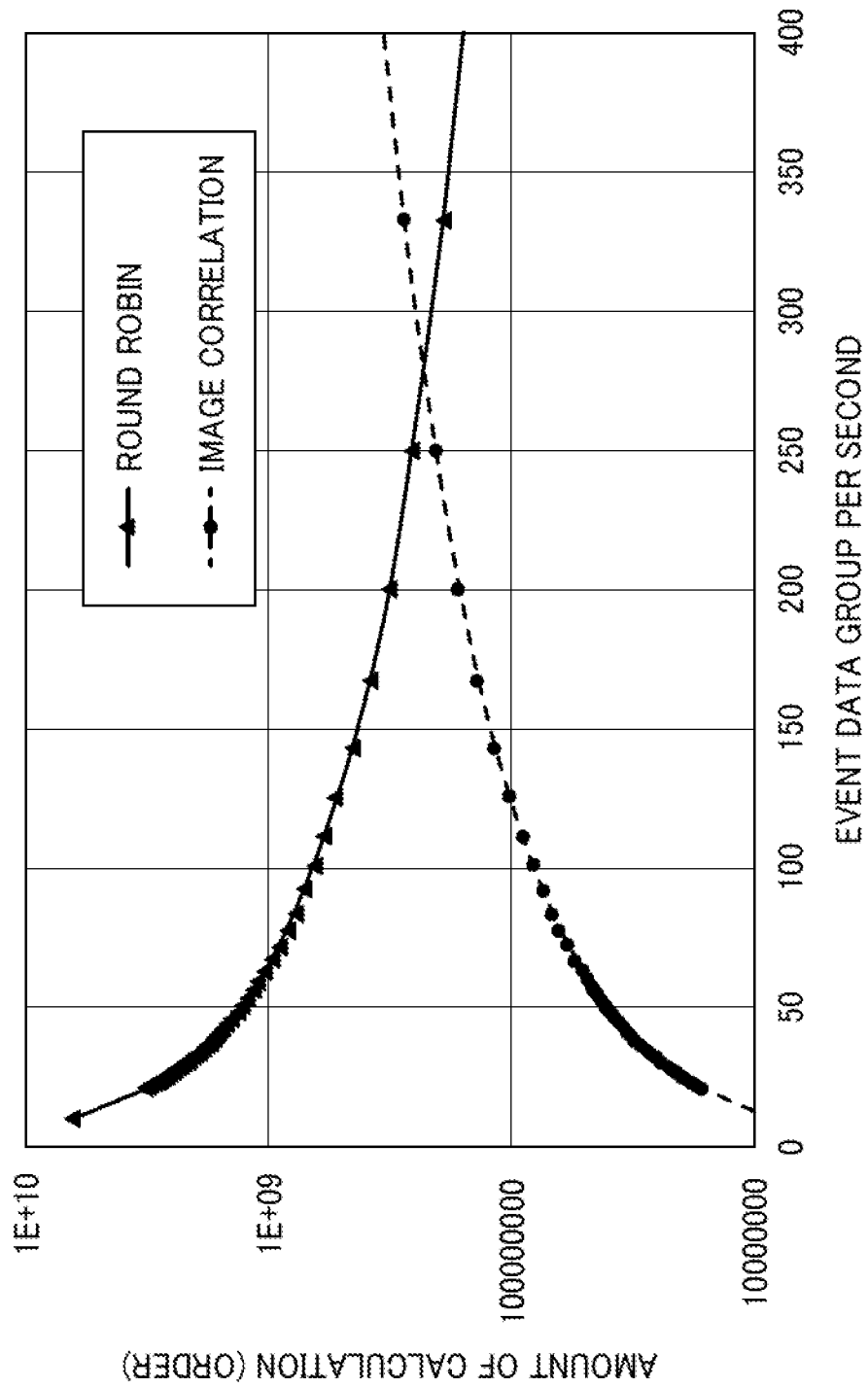
FIG. 11 is a graph illustrating an example of the amount of calculation with the displacement estimation unit included in the displacement measurement device according to an embodiment.

FIG. 11 is a graph illustrating an example of the amount of calculation with the displacement estimation unit 151 included in the displacement measurement device 100 according to an embodiment.

The graph illustrated in FIG. 11 depicts the amount of calculation to be performed with the displacement measurement device 100 when the event-based vision camera 131 including 320×240 picture elements outputs 10000 items of event data per second.

In the graph illustrated in FIG. 11, the horizontal axis represents an event data group per second, which indicates the velocity resolution of a displacement. The larger the value of the event data group per second is, the faster the displacement of the measurement object 10 can be followed. When an event data group includes n items of event data, the value of the event data group per second is given by dividing n by the number of items of event data output per second.

In the graph illustrated in FIG. 11, legends indicate the round-robin method, which is represented by a solid line with triangles, and the image correlation method, which is represented by a broken line with circles. The round-robin method is used for the displacement measurement device 100 according to an embodiment. By contrast, the image correlation method is used for an existing displacement measurement device.

The round-robin method is a method for calculating difference values for all combinations of all luminance-change coordinate points included in one event data group and all luminance-change coordinate points included in the other event data group and calculating the mode of the calculated difference values as the amount of displacement of the measurement object 10.

The image correlation method is a method for determining the amount of displacement of the measurement object 10 from a correlation between two images generated from two event data groups.

The round-robin method involves calculation of difference values for all combinations. The amount of calculation for determining difference values by round robin is given by $O(n^2)$, and the amount of calculation for determining frequency distributions is given by $O(n^2)$. The total amount of calculation is given by $O(n^2)$. In the round-robin method, the amount of calculation for determining the amount of displacement of the measurement object 10 can be expressed by Equation (1) below.

$$O(n^2)=O(n^2)+O(n^2) \tag{1}$$

In the round-robin method, accordingly, the amount of calculation per operation is in proportion to the number n of items of event data included in the event data group. The event data group per second is in inverse proportion to the number n of items of event data included in the event data group. Therefore, the amount of calculation for the event data group per second is in an inverse proportional relationship.

In the image correlation method, two images are subjected to a Fourier transform to generate a composite image, and the composite image is subjected to an inverse Fourier transform. The amount of calculation for the Fourier transform and the inverse Fourier transform is represented by N log N, where N is the number of pixels. The amount of calculation for generating the composite image is N. In the image correlation method, the amount of calculation for determining the amount of displacement of the measurement object 10 can be expressed by Equation (2) below.

$$O(N \log N) = O(N \log N) + O(N) \qquad (2)$$

In the image correlation method, accordingly, the amount of calculation per operation does not depend on the number n of items of event data included in the event data group. Thus, the amount of calculation for the event data group per second is substantially in proportion.

The graph illustrated in FIG. 11 indicates that, in a situation in which the event data group per second exceeds about 275 (situation in which the measurement object 10 is displaced at a high speed), the round-robin method, which is used for the displacement measurement device 100 according to an embodiment, can estimate the amount of displacement of the measurement object 10 with a smaller amount of calculation than the image correlation method, which is used for the existing displacement measurement device.

Other Example of Displacement Calculation Method Using Displacement Estimation Unit 151

FIGS. 12A and 12B are illustrations of another example method for calculating the amount of displacement of the measurement object 10 by using the displacement estimation unit 151 included in the displacement measurement device 100 according to an embodiment.

Referring to FIGS. 12A and 12B, a method for calculating the amount of displacement of the measurement object 10 will be described typically using five luminance-change coordinate points included in an event data group.

In FIGS. 12A and 12B, luminance-change coordinate points 700 are detected at times before the displacement of the rough surface 10A. In FIGS. 12A and 12B, luminance-change coordinate points 700' are detected at times after the displacement of the rough surface 10A. The luminance-change coordinate points 700' are obtained by translating the luminance-change coordinate points 700.

The numbers assigned to the luminance-change coordinate points 700 and 700' represent the orders of the coordinate values on the Y axis that are sorted in descending order. In FIG. 12B, the luminance-change coordinate points 700 and 700' illustrated in FIG. 12A are arranged on the same line (i.e., along the Y axis) in descending order of the coordinate values on the Y axis.

In the sort method, the displacement estimation unit 151 calculates a difference value between the coordinate value of each of the five luminance-change coordinate points 700 and the coordinate value of the luminance-change coordinate point 700' having the same number.

For example, the displacement estimation unit 151 calculates a difference value between the coordinate value of the luminance-change coordinate point 700 assigned "1" and the coordinate value of the luminance-change coordinate point 700' assigned "1".

For example, the displacement estimation unit 151 calculates a difference value between the coordinate value of the luminance-change coordinate point 700 assigned "2" and the coordinate value of the luminance-change coordinate point 700' assigned "2".

Likewise, the displacement estimation unit 151 calculates a difference value between the coordinate value of the luminance-change coordinate point 700 assigned any other number and the coordinate value of the luminance-change coordinate point 700' assigned the same number.

As a result, the displacement estimation unit 151 can calculate a difference value between each of the plurality of luminance-change coordinate points 700 and the luminance-change coordinate point 700' assigned the same number. In other words, the displacement estimation unit 151 can calculate a difference value equal to the total amount of translation. Accordingly, the displacement estimation unit 151 can calculate difference values with a smaller amount of computation than that in the round-robin method illustrated in FIGS. 7A to 7C.

In the sort method, in an example, the displacement estimation unit 151 may calculate difference values between each of the five luminance-change coordinate points 700 and the luminance-change coordinate point 700' assigned the same number and a plurality of luminance-change coordinate points 700' assigned nearby numbers.

For example, the displacement estimation unit 151 may calculate a difference value between the luminance-change coordinate point 700 assigned "2" and the luminance-change coordinate point 700' assigned "2", a difference value between the luminance-change coordinate point 700 assigned "2" and the luminance-change coordinate points 700' assigned "1", and a difference value between the luminance-change coordinate point 700 assigned "2" and the luminance-change coordinate points 700' assigned "3".

Accordingly, even if the numbers are not aligned between the luminance-change coordinate points 700 and the luminance-change coordinate points 700' due to noise, overlapping of event data, or any other factor, the displacement estimation unit 151 can calculate a difference value between each of the luminance-change coordinate points 700 and a corresponding one of the luminance-change coordinate points 700'.

Example of Amount of Calculation with Displacement Estimation Unit 151

Figure 13:
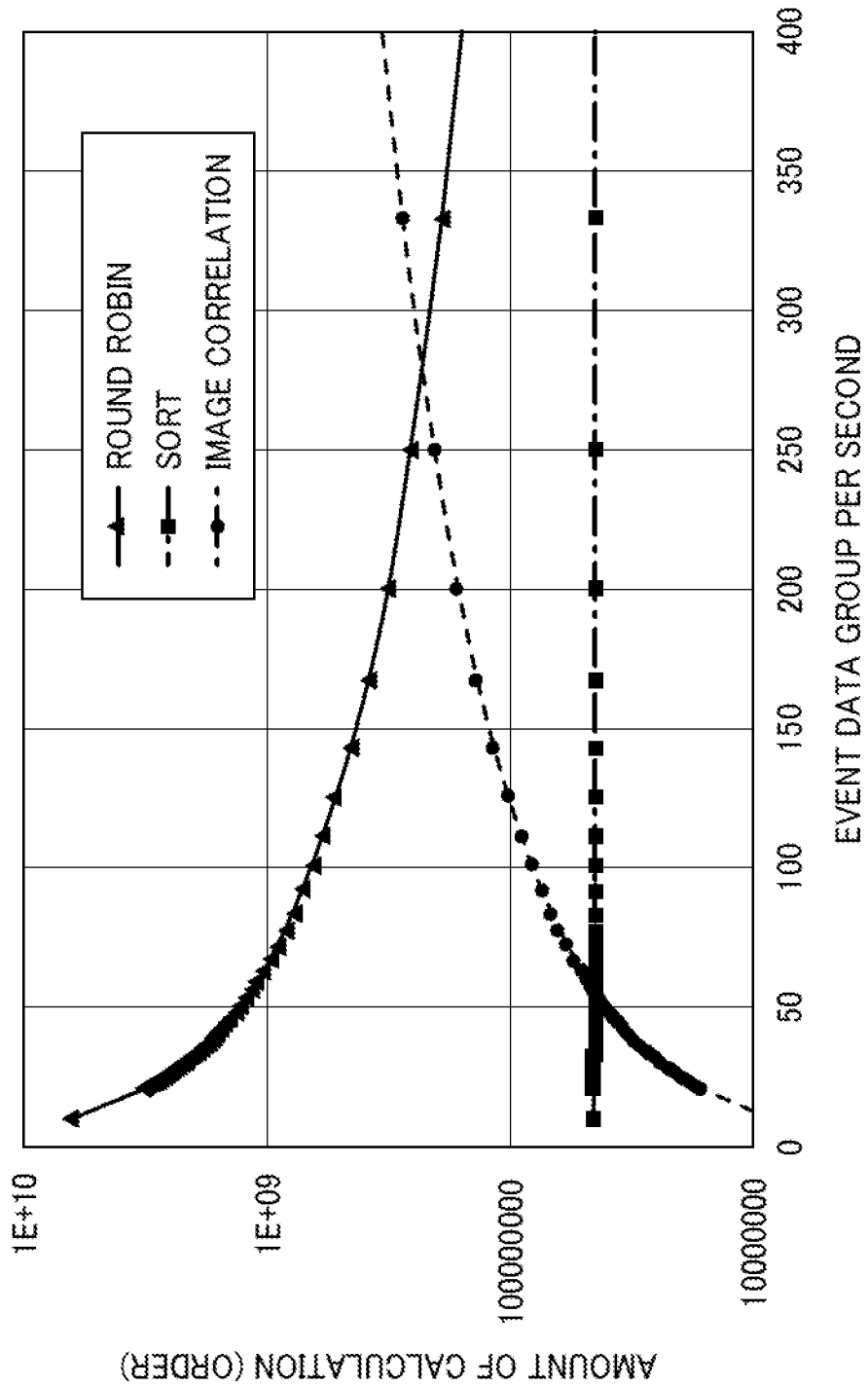
FIG. 13 is a graph illustrating another example of the amount of calculation with the displacement estimation unit included in the displacement measurement device according to an embodiment.

FIG. 13 is a graph illustrating another example of the amount of calculation with the displacement estimation unit 151 included in the displacement measurement device 100 according to an embodiment.

The graph illustrated in FIG. 13 depicts the amount of calculation to be performed with the displacement measurement device 100 when the event-based vision camera 131 including 320×240 picture elements outputs 10000 items of event data per second.

In the graph illustrated in FIG. 13, legends indicate the round-robin method, which is represented by a solid line with triangles, the image correlation method, which is represented by a broken line with circles, and the sort method, which is represented by a dash-dot line with rectangles. The sort method is another method used for the displacement measurement device 100 according to an embodiment.

In the sort method, in an example, for each source luminance-change coordinate point (corresponding to each of the luminance-change coordinate points 700 illustrated in FIGS. 12A and 12B), the range of the target luminance-change coordinate points (corresponding to corresponding ones of the luminance-change coordinate points 700' illustrated in FIGS. 12A and 12B) is set to "the same number ±3". In other words, the number of target luminance-change coordinate points (the number of nearby areas) is set to "7".

The sort method involves a calculation of n log(n) to sort a sequence of numbers in an event data group. A calculation of 2n log(n) is used to calculate the calculation on two sequences of numbers.

In this example, the sort method involves a calculation of 7n, where the number of items of event data included in the event data group is represented by n and the number of target luminance-change coordinate points (the number of nearby areas) is represented by "7".

Furthermore, the sort method involves a calculation of O(n log n) to sort a sequence of numbers in an event data group, a calculation of O(n) for coordinate difference calculation, and a calculation of O(n) for frequency distribution calculation. Thus, the sort method involves a calculation of O(n log n) in total.

In the sort method, the amount of calculation for determining the amount of displacement of the measurement object 10 can be expressed by Equation (3) below.

$$O(n \log n) = O(n \log n) + O(n) \tag{3}$$

In the sort method, accordingly, the amount of calculation per operation is in proportion to n log(n). The event data group per second is in inverse proportion to the number n of items of event data included in the event data group. Accordingly, the amount of calculation for the event data group per second is in proportion to log(n). When n is large, the amount of calculation is substantially constant.

The graph illustrated in FIG. 13 indicates that the sort method can estimate the amount of displacement of the measurement object 10 with a smaller amount of calculation than the round-robin method.

Other Example Functional Configuration of Displacement Estimation Unit 151

Figure 14:
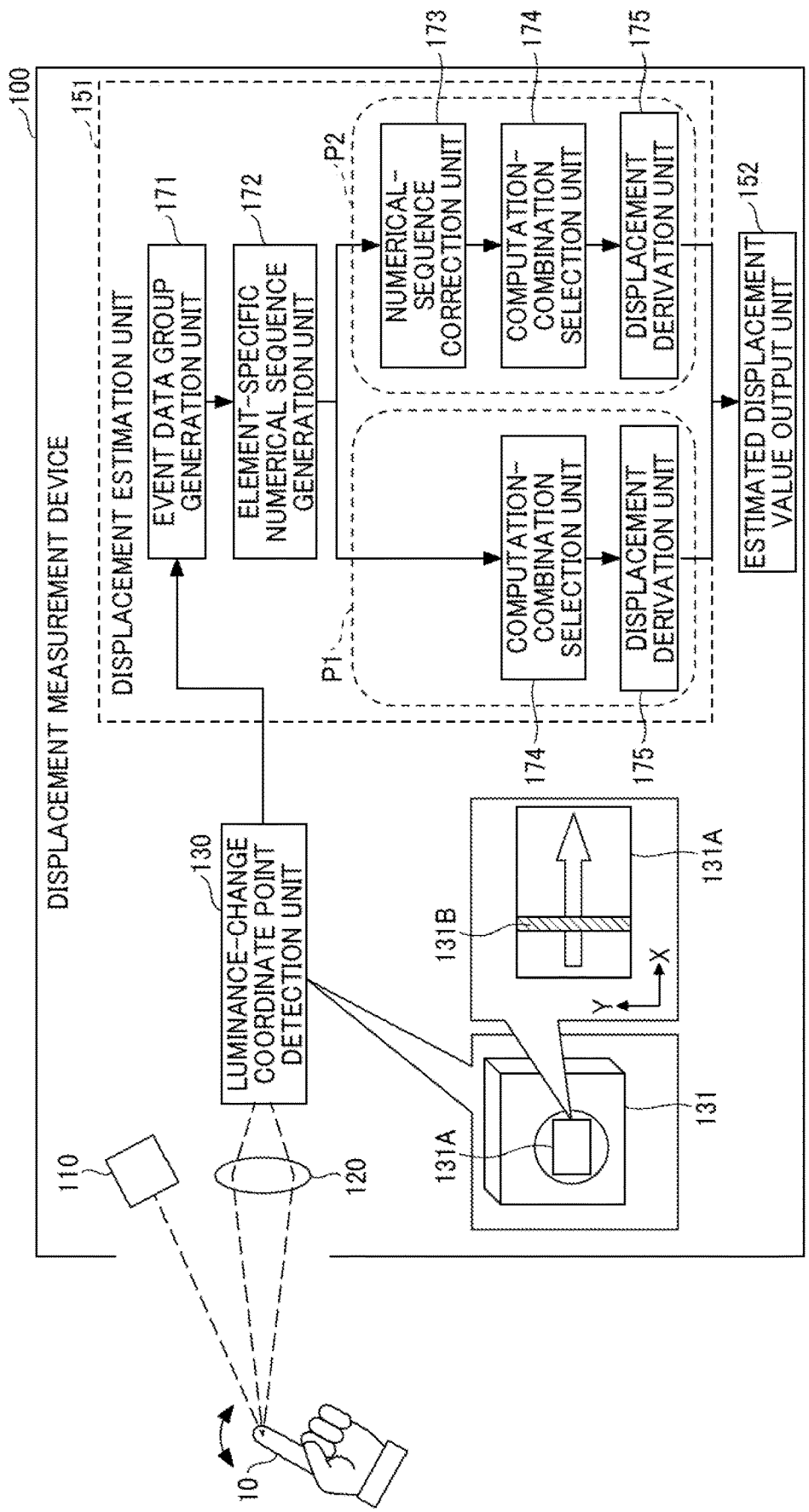
FIG. 14 is a diagram illustrating another example functional configuration of the displacement estimation unit included in the displacement measurement device according to an embodiment.

FIG. 14 is a diagram illustrating another example functional configuration of the displacement estimation unit 151 included in the displacement measurement device 100 according to an embodiment.

In the displacement measurement device 100 illustrated in FIG. 14, the event-based vision camera 131 of the luminance-change coordinate point detection unit 130 includes a light-receiving element 131A having an exposure area 131B. The exposure area 131B is scanned in the X-axis direction over time. Accordingly, the X-coordinate values of the event data output from the event-based vision camera 131 are periodically sorted in advance.

With this configuration, the displacement estimation unit 151 sorts only the second numerical sequence on the Y-axis, and the numerical-sequence correction unit 173 of the first numerical-sequence processing system P1 may be omitted. In the displacement measurement device 100 illustrated in FIG. 14, therefore, the amount of computation performed by the displacement estimation unit 151 can further be reduced.

Still Other Example Functional Configuration of Displacement Estimation Unit 151

Figure 15:
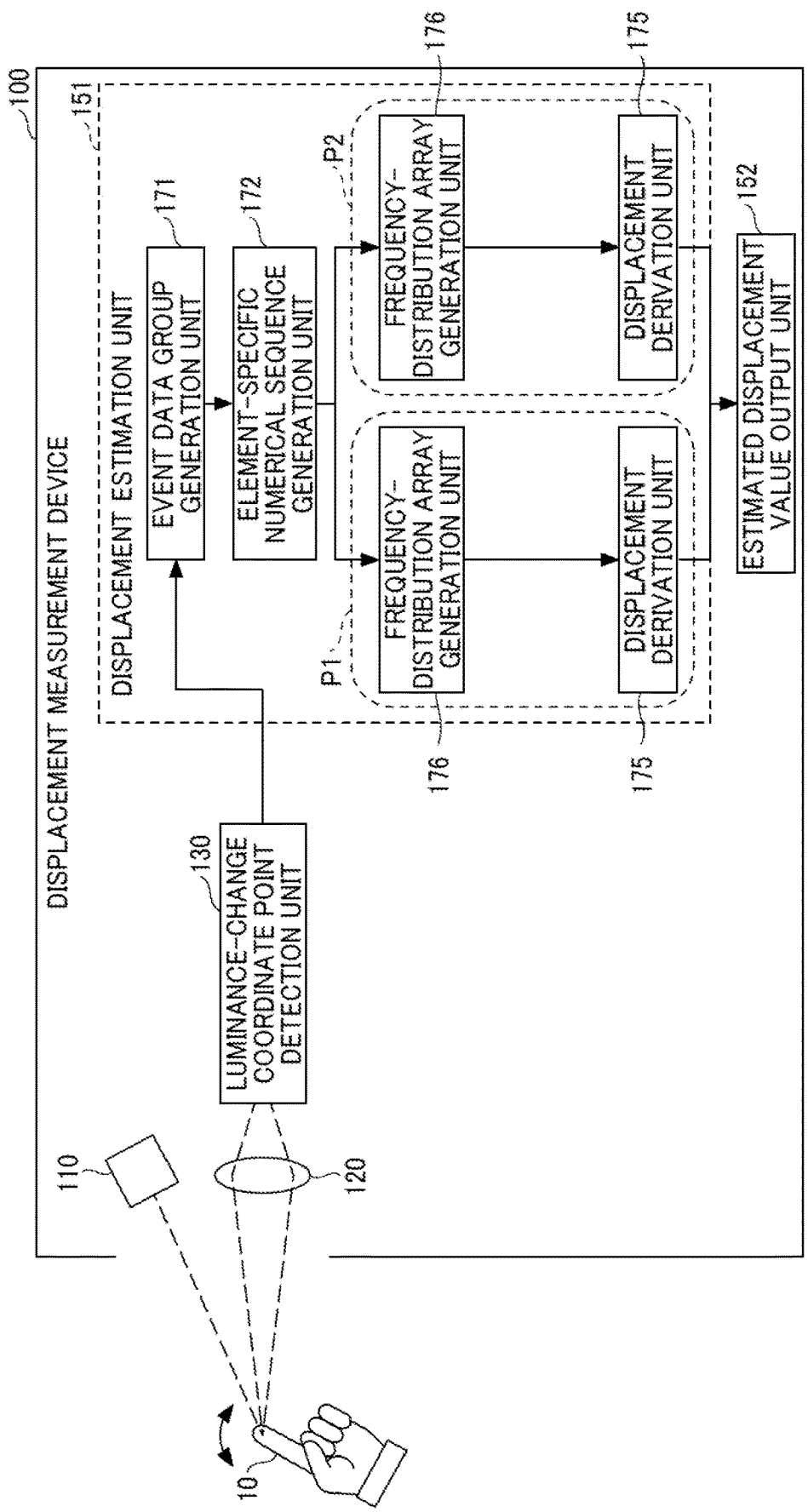
FIG. 15 is a diagram illustrating still another example functional configuration of the displacement estimation unit included in the displacement measurement device according to an embodiment.

FIG. 15 is a diagram illustrating still another example functional configuration of the displacement estimation unit 151 included in the displacement measurement device 100 according to an embodiment.

The displacement measurement device 100 illustrated in FIG. 15 is different from the displacement measurement device 100 illustrated in FIG. 9 in that the first numerical-sequence processing system P1 and the second numerical-sequence processing system P2 each include a frequency-distribution array generation unit 176 in place of the numerical-sequence correction unit 173. The frequency-distribution array generation unit 176 generates two frequency-distribution arrays from two event data groups obtained at different times.

The displacement measurement device 100 illustrated in FIG. 15 is further different from the displacement measurement device 100 illustrated in FIG. 9 in that the displacement derivation unit 175 in each of the first numerical-sequence processing system P1 and the second numerical-sequence processing system P2 uses a convolution operation method instead of the round-robin method to calculate the amount of displacement of the measurement object 10.

The displacement measurement device 100 illustrated in FIG. 15 is further different from the displacement measurement device 100 illustrated in FIG. 9 in that the first numerical-sequence processing system P1 and the second numerical-sequence processing system P2 each do not include the computation-combination selection unit 174.

The method for calculating the amount of displacement of the measurement object 10 by using the convolution operation method, which is performed by the displacement derivation units 175 included in the displacement measurement device 100 illustrated in FIG. 15, will be described, with focus on the X-axis coordinate elements of the event data groups.

In the following description, the number of sensors of an event camera in the X-axis direction is denoted by M, a chronologically earlier event data group is denoted by A, and a chronologically later event data group is denoted by B.

The event data group A includes N items of event data, and the X coordinates of the N items of event data are represented by Ax0, Ax1, Ax2, . . . , and AxN−1.

The event data group B includes N items of event data, and the X coordinates of the N items of event data are represented by Bx0, Bx1, Bx2, . . . , and BxN−1.

The coordinates Axi and Bxi (i=0, 1, . . . N−1) are integers in the range (0 to M−1) of the X coordinates.

Arrays focusing on the numbers of items of event data having the same coordinate among the coordinates Ax and Bx, which are respectively the coordinate information of the event data groups A and B, are denoted by s and t, respectively. In the array s, the number of items of event data having Ax expressed by M−1−i within the event data group A is defined as s[i]. In the array t, the number of items of event data having Bx expressed by i within the event data group B is defined as t[i]. From the arrays s and t, an array d obtained by Equation (4) below can be defined.

$$d[k] = \Sigma_{i+j=k} s[i] \cdot t[j] (k=0,1,\ldots,2M-2) \tag{4}$$

The value d[k] is equal to the number of sets of integers (i, j) (0≤i and j≤N−1) that satisfy Bxj−Ax_i=k−(M−1).

Transforming the right side of Equation (4) yields Equation (5) below, which can be expressed in the form of convolution.

$$d[k] = \sum_{i+j=k} s[i] \cdot t[j] = \sum_{i=0}^{M-1} s[i] \cdot [k-i](k=0, 1, \ldots, 2M-2) \tag{5}$$

Accordingly, if the arrays s, t, and d are subjected to a discrete Fourier transform to obtain arrays S, T, and D, respectively, the array D can be calculated by the following equation.

$$D[k]=S[k] \cdot T[k](k=0,1,\ldots,2M-2)$$

The array D (first array) is further subjected to an inverse discrete Fourier transform to obtain the array d (second array). Since the array d indicates the frequency of a difference coordinate, the mode of the array d is extracted to estimate the amount of translation of the speckle.

In the convolution operation method, the frequency of a difference between numerical sequences is determined by using a discrete Fourier transform. It is thus preferable that the first numerical-sequence processing system P1 and the second numerical-sequence processing system P2 each include an FPGA, a GPU, or the like that can perform advanced computational processing.

Hardware Configuration of Information Processing Unit 150

Figure 16:
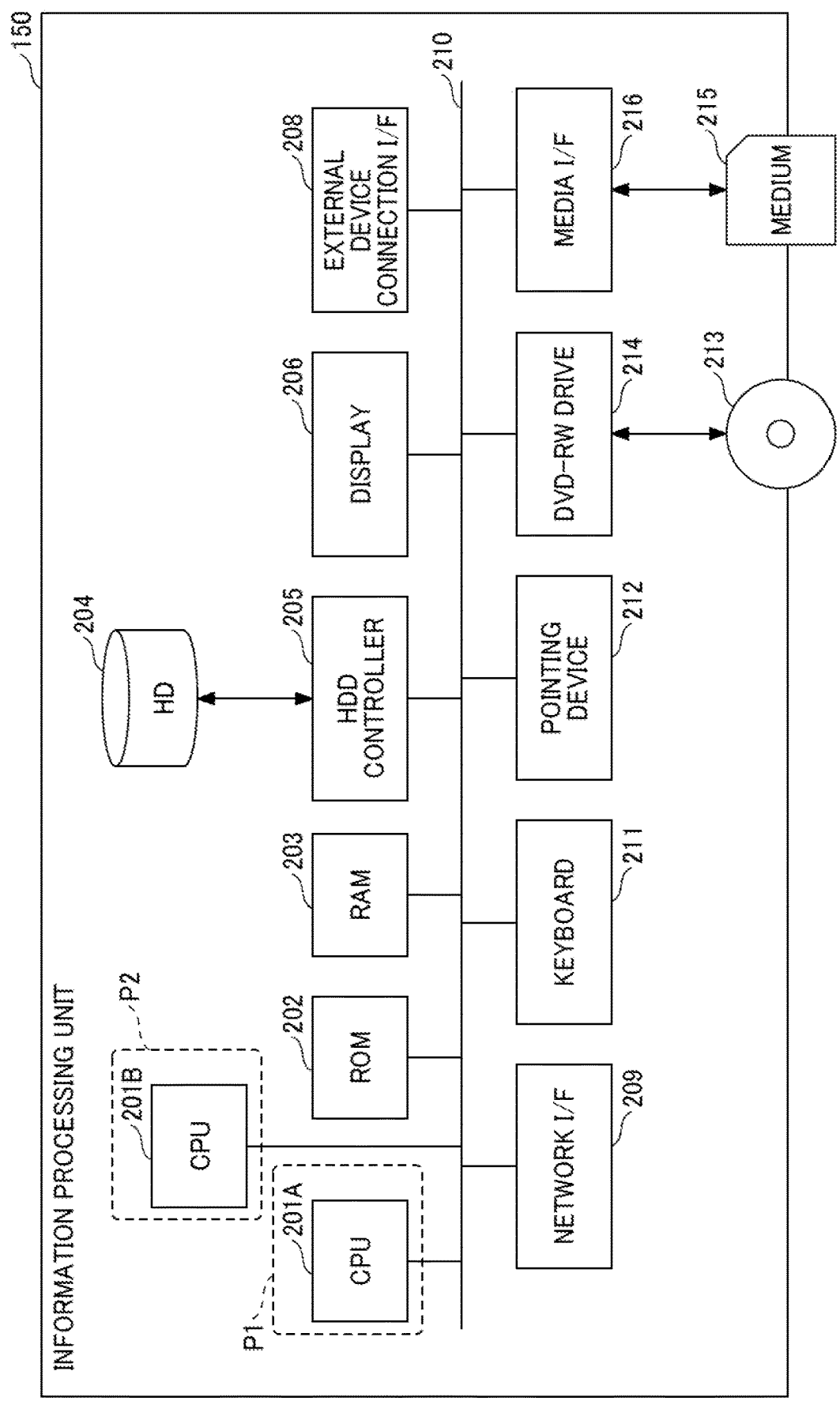
FIG. 16 is a diagram illustrating an example hardware configuration of an information processing unit included in the displacement measurement device according to an embodiment.

FIG. 16 is a diagram illustrating an example hardware configuration of the information processing unit 150 included in the displacement measurement device 100 according to an embodiment. FIG. 16 illustrates an example hardware configuration of the information processing unit 150 in a case where the information processing unit 150 is implemented by a personal computer.

As illustrated in FIG. 16, the information processing unit 150 is implemented by a computer and includes central processing units (CPUs) 201A and 201B, a read-only memory (ROM) 202, a random access memory (RAM) 203, a hard disk (HD) 204, a hard disk drive (HDD) controller 205, a display 206, an external device connection interface (I/F) 208, a network I/F 209, a data bus 210, a keyboard 211, a pointing device 212, a digital versatile disc rewritable (DVD-RW) drive 214, and a media I/F 216.

The CPUs 201A and 201B control the overall operation of the information processing unit 150. The ROM 202 stores a program such as an initial program loader (IPL) to boot the CPUs 201A and 201B. The RAM 203 is used as a work area for the CPUs 201A and 201B. The HD 204 stores various data such as a program. The HDD controller 205 controls reading or writing of various data from or to the HD 204 under the control of the CPUs 201A and 201B.

The display 206 displays various kinds of information such as a cursor, a menu, a window, text, or an image. The external device connection I/F 208 is an interface for connecting to various external devices. Examples of the external devices include, but are not limited to, a universal serial bus (USB) memory and a printer. The network I/F 209 is an interface for performing data communication using a communication network. The data bus 210 is an address bus, a data bus, or the like for electrically connecting various components illustrated in FIG. 16, such as the CPUs 201A and 201B, to each other.

The keyboard 211 is an example of an input unit provided with a plurality of keys to allow the user to enter characters, numerical values, or various instructions. The pointing device 212 is an example of an input unit that allows the user to select or execute a specific instruction, select a target for processing, or move a cursor being displayed. The DVD-RW drive 214 controls reading or writing of various data from or to a DVD-RW 213, which is an example of a removable recording medium. The removable recording medium is not limited to a DVD-RW and may be a digital versatile disc recordable (DVD-R), for example. The media I/F 216 controls reading or writing (storing) of data from or to a recording medium 215 such as a flash memory.

As described above, the information processing unit 150 includes two CPUs (i.e., the CPUs 201A and 201B). For example, the CPU 201A executes processing of the first numerical-sequence processing system P1. For example, the CPU 201B executes processing of the second numerical-sequence processing system P2. The CPUs 201A and 201B can execute processing operations in parallel with each other. Accordingly, the information processing unit 150 can execute, in parallel, computation of the first numerical sequence by using the CPU 201A (i.e., the first numerical-sequence processing system P1) and computation of the second numerical sequence by using the CPU 201B (i.e., the second numerical-sequence processing system P2).

The first numerical-sequence processing system P1 and the second numerical-sequence processing system P2 may be any combination of hardware components that can execute processing operations in parallel with each other. In an example, the first numerical-sequence processing system P1 and the second numerical-sequence processing system P2 are not limited to a combination of two CPUs, and a combination of two computation circuits may be used. In another example, a combination of two computers or any other suitable combination of hardware components may be used.

First Example Implementation

Figure 17:
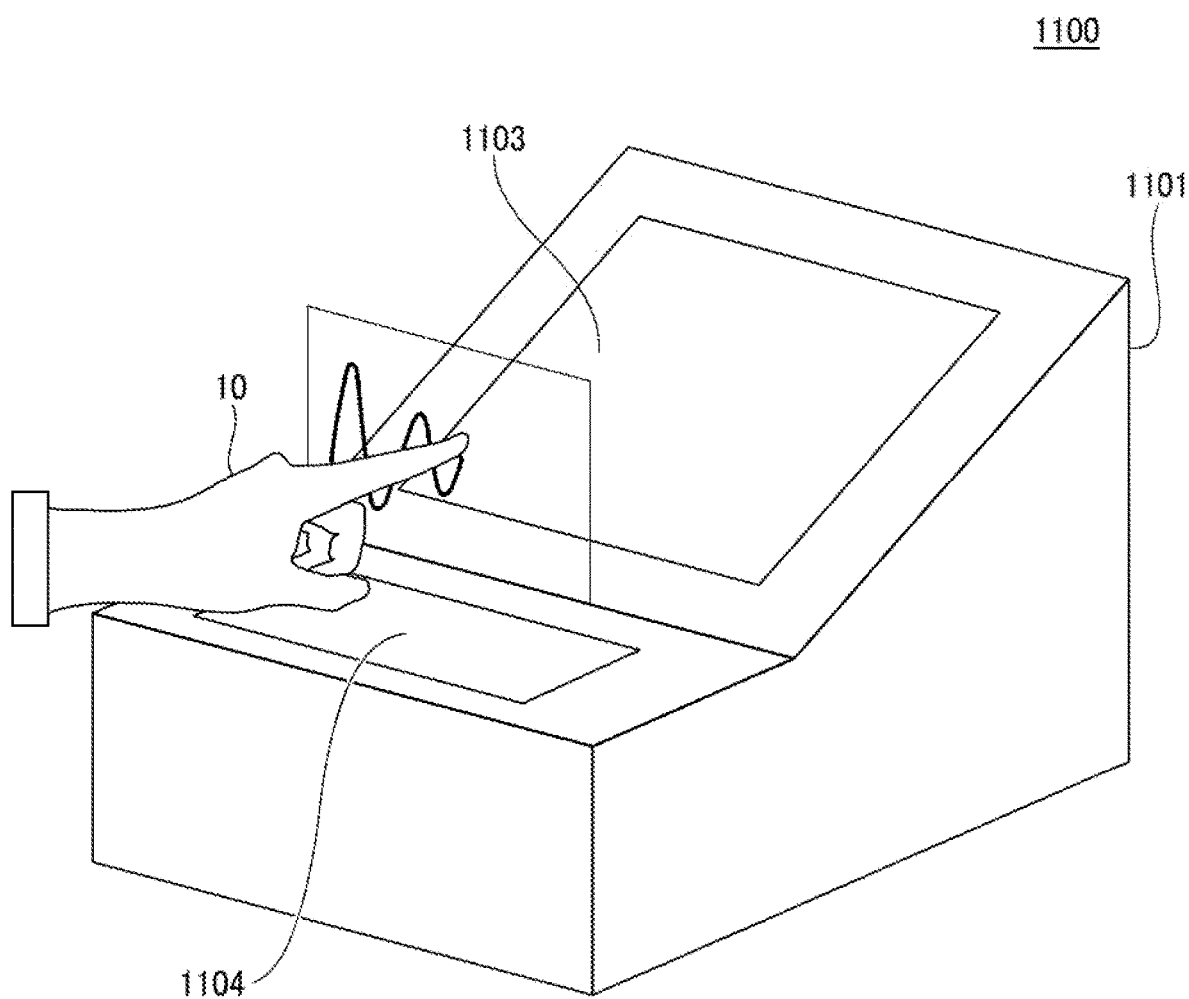
FIG. 17 is a schematic view of a non-contact input apparatus that is a first example implementation of the displacement measurement device according to an embodiment.
Figure 18:
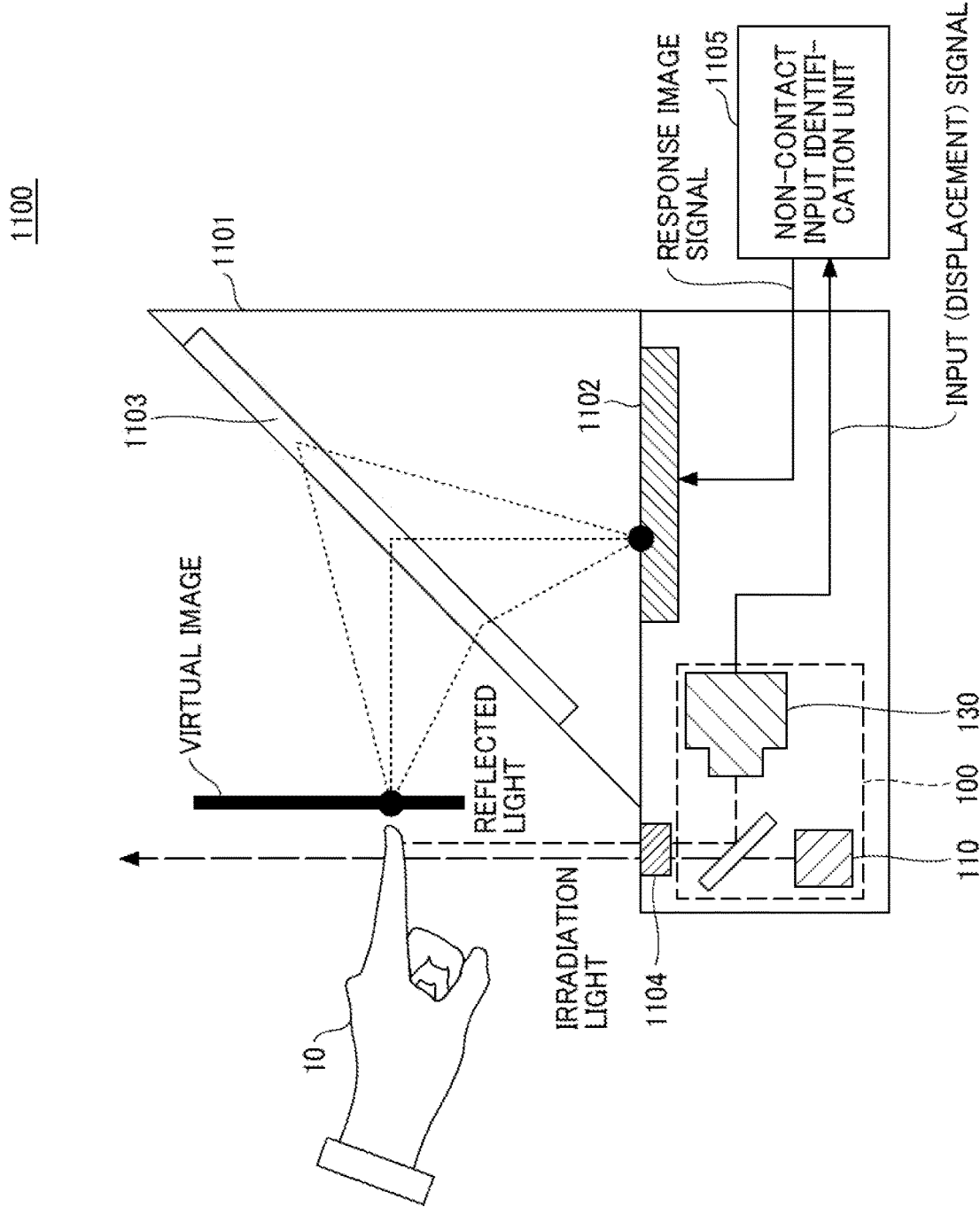
FIG. 18 is a diagram illustrating the cross section of the non-contact input apparatus that is the first example implementation of the displacement measurement device according to the embodiment.

FIG. 17 is a schematic view of a non-contact input apparatus 1100, which is a first example implementation of the displacement measurement device 100 according to an embodiment. FIG. 18 is a diagram illustrating the cross section of the non-contact input apparatus 1100, which is the first example implementation of the displacement measurement device 100 according to the embodiment.

As illustrated in FIGS. 17 and 18, the non-contact input apparatus 1100 includes a housing 1101, an image display unit 1102, an image forming plate 1103, an optical window 1104, a non-contact input identification unit 1105, and a displacement measurement device 100. In an example, the non-contact input apparatus 1100 may include the displacement measurement device 100 according to an embodiment. In FIGS. 17 and 18, the illustration of the interference pattern forming unit 120 included in the displacement measurement device 100 is omitted.

In the non-contact input apparatus 1100, the irradiation unit 110 included in the displacement measurement device 100 emits coherent light, which emerges as a light sheet, upward and forward from the housing 1101. In other words, the irradiation unit 110 emits coherent light near a virtual image formed by the image display unit 1102 and the image forming plate 1103. In response to the measurement object 10 (e.g., the finger of the operator) moving transversely to the light sheet for an operation on the virtual image without contact of the measurement object 10, reflected light of the light sheet from the measurement object 10 is incident on the luminance-change coordinate point detection unit 130 included in the displacement measurement device 100 in the housing 1101 through the optical window 1104 as an interference pattern.

Accordingly, the information processing unit 150 included in the displacement measurement device 100 can detect the amount of micro-displacement of the measurement object 10 and output information indicating the detected amount of micro-displacement of the measurement object 10 to the non-contact input identification unit 1105.

The non-contact input identification unit 1105 can accurately detect the non-contact operation made by the measurement object 10 (e.g., a push of the finger, handwriting, or a swipe of the finger), based on the information output from the displacement measurement device 100, which indicates the amount of micro-displacement of the measurement object 10. Further, the non-contact input identification unit 1105 can output the detection result to an operation target apparatus or feed back the detection result to the operator. The non-contact input identification unit 1105 may be implemented by, for example, a PC, which may include a processor, memory, and interface.

In the non-contact input apparatus 1100, in an example, the image forming plate 1103 may be used to form a virtual image from video information or an image displayed on the image display unit 1102 and display the virtual image above and in front of the housing 1101 to improve the operability. As illustrated in FIG. 18, the image forming plate 1103 is a member having characteristics of transmission and deflection of light beams. In an example, the image forming plate 1103 is implemented by a layered reflection structure.

In the non-contact input apparatus 1100 including the displacement measurement device 100 according to an embodiment, the displacement measurement device 100 can quickly and reliably capture a small non-contact movement of the measurement object 10 (the finger of the operator). In other words, the displacement measurement device 100 can accurately detect a non-contact operation of the measurement object 10 (the finger of the operator).

Second Example Implementation

Figure 19:
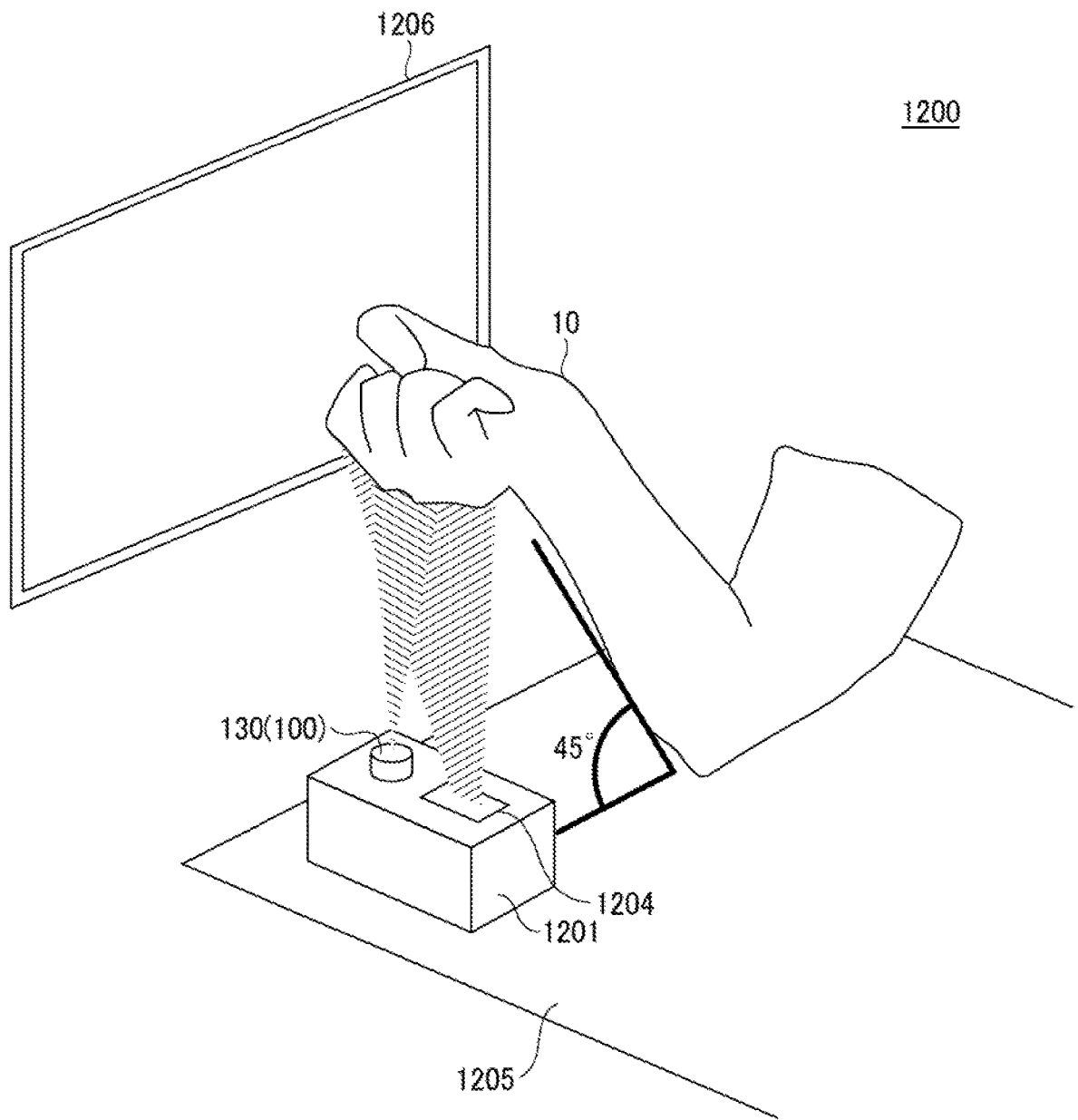
FIG. 19 is a schematic view of a tremor measurement apparatus that is a second example implementation of the displacement measurement device according to an embodiment.
Figure 20:
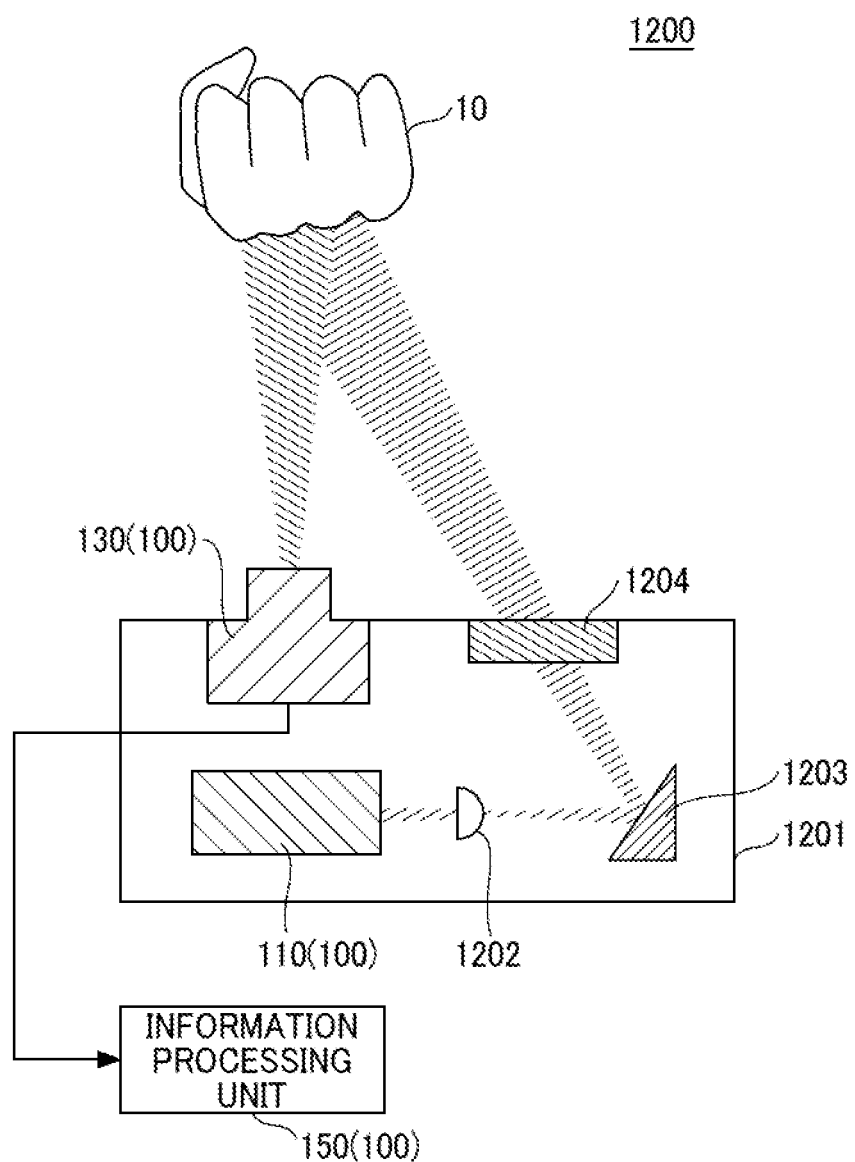
FIG. 20 is a diagram illustrating the cross section of the tremor measurement apparatus that is the second example implementation of the displacement measurement device according to the embodiment.

FIG. 19 is a schematic view of a tremor measurement apparatus 1200, which is a second example implementation of the displacement measurement device 100 according to an embodiment. FIG. 20 is a diagram illustrating the cross section of the tremor measurement apparatus 1200, which is the second example implementation of the displacement measurement device 100 according to the embodiment.

As illustrated in FIGS. 19 and 20, the tremor measurement apparatus 1200 includes a housing 1201, a cylindrical lens 1202, a turning mirror 1203, an optical window 1204, a support 1205, a display device 1206, and a displacement measurement device 100. The tremor measurement apparatus 1200 is an example of a "biological micromotion measurement apparatus". In an example, the tremor measurement apparatus 1200 may include the displacement measurement device 100 according to an embodiment. In FIGS. 19 and 20, the illustration of the interference pattern forming unit 120 included in the displacement measurement device 100 is omitted. The cylindrical lens 1202, the turning mirror 1203, and the optical window 1204 are collectively referred to as an optical system.

The tremor measurement apparatus 1200 illustrated in FIGS. 19 and 20 is an apparatus configured to detect slight movements (e.g., tremors) of a living organism, which is the measurement object 10. Tremor is an involuntary movement caused by alternating contraction and relaxation of muscles. Trembling of the hand is a typical example of tremors. Tremors may be caused by conditions such as stress, anxiety, fatigue, hyperthyroidism, and alcoholic withdrawal. Rest tremor is one of the main symptoms in Parkinson's disease.

In the related art, the tremor is measured by measurement of the myoelectric potential or with an acceleration sensor. The tremor measurement apparatus 1200 illustrated in FIGS. 19 and 20 including the displacement measurement device 100 can capture micro-vibrations of the measurement object 10 on the micrometer level. As a result, the tremor can be measured with high accuracy in a non-contact environment.

As illustrated in FIG. 19, the tremor measurement apparatus 1200 measures the tremor with the angle between the elbow and the forearm being kept at 45 degrees relative to the horizontal support 1205. In the tremor measurement apparatus 1200, the irradiation unit 110 emits coherent light to the back of the hand, and reflected light of the coherent light from the back of the hand is incident on the luminance-change coordinate point detection unit 130 as an interference pattern.

Accordingly, the information processing unit 150 included in the displacement measurement device 100 can detect the amount of micro-displacement of the measurement object 10. In other words, the information processing unit 150 can measure the tremor of the measurement object 10 with high accuracy. The tremor data measured by the displacement measurement device 100 is subjected to frequency analysis or the like and can be used to help understand the condition of the person (i.e., the operator) or used as medical data.

While some embodiments of the present disclosure have been described in detail, the present disclosure is not limited to these embodiments and may be modified or changed in various ways without departing from the spirit of the present disclosure as defined in the appended claims.

The functions of the "displacement measurement device" may be physically implemented by one device or physically implemented by a plurality of devices. A plurality of devices that implements the "displacement measurement device" may be referred to as a "displacement measurement system".

In some embodiments of the present disclosure, the "displacement measurement device" may be applied to apparatuses other than a "biological micromotion measurement apparatus" and a "non-contact input apparatus". In embodiments of the present disclosure, the "displacement measurement device" may be applied to a game console, an input/output apparatus, and so on. In embodiments of the present disclosure, the "displacement measurement device" may be applied not only to an apparatus that uses the detection of micro-displacement but also to an apparatus for removing small movement errors.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In one example, a displacement measurement system includes: an irradiation unit configured to irradiate a measurement object with coherent light; a luminance-change coordinate point detection unit configured to detect a luminance-change coordinate point where a luminance change has occurred, based on light reflected from the measurement object, and output data related to the luminance-change coordinate point; and circuitry configured to calculate an amount of displacement of the measurement object, based on the data related to the luminance-change coordinate point, by performing computations of a first numerical sequence and a second numerical sequence. The first numerical sequence including a set of first elements each representing a location of the luminance-change coordinate point extracted from the data. The second numerical sequence including a set of second elements each representing a location of the luminance-change coordinate point extracted from the data.

The invention claimed is:

1. A displacement measurement device comprising:
an irradiator that irradiates a measurement object with coherent light;
a luminance-change coordinate point detector that detects a luminance-change coordinate point where a luminance change has occurred, based on light reflected from the measurement object, and output data related to the luminance-change coordinate point; and
circuitry configured to calculate an amount of displacement of the measurement object, based on the data related to the luminance-change coordinate point, by performing computations of a first numerical sequence and a second numerical sequence,
the first numerical sequence including a set of first elements each representing a location of the luminance-change coordinate point extracted from the data, and
the second numerical sequence including a set of second elements each representing a location of the luminance-change coordinate point extracted from the data.

2. The displacement measurement device according to claim 1, wherein the circuitry is configured to perform, in parallel, the computation of the first numerical sequence and the computation of the second numerical sequence.

3. The displacement measurement device according to claim 1, wherein the luminance-change coordinate point detection unit includes:
an event-based vision camera that detects the luminance-change coordinate point based on the reflected light and output the data related to the luminance-change coordinate point.

4. The displacement measurement device according to claim 1, wherein the luminance-change coordinate point detection unit includes:
a frame camera that captures a frame image of the measurement object by using the reflected light; and
circuitry configured to calculate a luminance difference between pixels in a plurality of frame images output from the frame camera, each of the plurality of frame images including the frame image, and
extract, as the luminance-change coordinate point, a pixel for which the luminance difference that is calculated is greater than or equal to a preset value.

5. The displacement measurement device according to claim 1, wherein, in each of the first numerical sequence and the second numerical sequence,
the circuitry is configured to calculate difference values between coordinate values for combinations for two data groups at different times including a first data group and a second data group, the combinations including a plurality of luminance-change coordinate points included in the first data group and a plurality of luminance-change coordinate points included in the second data group, and derive a mode of the calculated difference values as the amount of displacement of the measurement object.

6. The displacement measurement device according to claim 1, wherein, in each of the first numerical sequence and the second numerical sequence,
the circuitry is configured to:
sort for two data groups at different times including a first data group and a second data group, such that a plurality of luminance-change coordinate points included in the first data group are sorted based on coordinate values of the plurality of luminance-change coordinate points and a plurality of luminance-change coordinate points included in the second data group are sorted based on coordinate values of the plurality of luminance-change coordinate points; and
calculate difference values between coordinate values for combinations of luminance-change coordinate points having the same order after the sorting among the plurality of luminance-change coordinate points included in the first data group and the plurality of luminance-change coordinate points included in the second data group, and derive a mode of the calculated difference values as the amount of displacement of the measurement object.

7. The displacement measurement device according to claim 6, wherein the circuitry is configured to calculate difference values between coordinate values for
combinations of luminance-change coordinate points having the same order after the sorting among the plurality of luminance-change coordinate points included in the first data group and the plurality of luminance-change coordinate points included in the second data group, and
combinations of luminance-change coordinate points having orders after the sorting among the plurality of luminance-change coordinate points included in the first data group and the plurality of luminance-change coordinate points included in the second data group, a difference between the orders being less than or equal to a predetermined value, and
derive a mode of the calculated difference values as the amount of displacement of the measurement object.

8. The displacement measurement device according to claim 6, wherein the circuitry is configured to periodically sort and output coordinate values, along a predetermined axis, of luminance-change coordinate points each included in the data, and
acquire at least one of the first data group including the coordinate values that are periodically sorted or the second data group including the coordinate values that are periodically sorted.

9. The displacement measurement device according to claim 1, wherein, in each of the first numerical sequence and the second numerical sequence, the circuitry is configured to:
generate two frequency-distribution arrays from two data groups obtained at different times;
perform a discrete Fourier transform of the two frequency-distribution arrays to acquire first arrays;
perform an inverse Fourier transform of a product of the acquired first arrays to generate a second array; and
derive a mode in the generated second array as the amount of displacement of the measurement object.

10. A non-contact input apparatus comprising:
the displacement measurement device according to claim 1; and
a non-contact input identifier that detects a non-contact operation based on information indicating the amount of displacement output from the displacement measurement device.

11. A biological micromotion measurement apparatus comprising:
the displacement measurement device according to claim 1; and
an optical system configured to receive reflected light from the measurement object, the reflected light resulting from light emitted from the displacement measurement device, the measurement object including a living organism,
the circuitry of the displacement measurement device being configured to detect an amount of micro-displacement of the measurement object by using the reflected light, and output information indicating the amount of micro-displacement.

12. A method for measuring displacement, comprising:
obtaining output data related to a luminance-change coordinate point, the luminance-change coordinate point being detected where a luminance change has occurred, based on light reflected from a measurement object irradiated with coherent light;
calculating an amount of displacement of the measurement object, based on the data related to the luminance-change coordinate point, by performing computations of a first numerical sequence and a second numerical sequence,
the first numerical sequence including a set of first elements each representing a location of the luminance-change coordinate point extracted from the data, and
the second numerical sequence including a set of second elements each representing a location of the luminance-change coordinate point extracted from the data; and
emitting the coherent light for an operation on a displayed virtual image.

13. A non-transitory recording medium storing a plurality of instructions which, when executed by one or more processors, cause the processors to perform a method for measuring displacement, comprising:
obtaining output data related to a luminance-change coordinate point, the luminance-change coordinate point being detected where a luminance change has occurred, based on light reflected from a measurement object irradiated with coherent light;
calculating an amount of displacement of the measurement object, based on the data related to the luminance-change coordinate point, by performing computations of a first numerical sequence and a second numerical sequence,
the first numerical sequence including a set of first elements each representing a location of the luminance-change coordinate point extracted from the data, and
the second numerical sequence including a set of second elements each representing a location of the luminance-change coordinate point extracted from the data; and
emitting the coherent light for an operation on a displayed virtual image.

* * * * *